United States Patent
Seo et al.

(10) Patent No.: US 10,482,082 B2
(45) Date of Patent: Nov. 19, 2019

(54) APPARATUS AND METHOD FOR PROCESSING QUERY

(71) Applicant: Samsung Electronics Co., Ltd., Suwon-si, Gyeonggi-do (KR)

(72) Inventors: Jae-Woo Seo, Suwon-si (KR); Yu-Na Kim, Suwon-si (KR); Ho-Jung Lee, Seoul (KR); Hyuk Kang, Yongin-si (KR); Ga-Jin Song, Anyang-si (KR); Jae-Bong Chun, Suwon-si (KR); Gyu-Cheol Choi, Gumi-si (KR); Sung-Hyuk Shin, Seongnam-si (KR); Myung-Gon Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/932,432

(22) Filed: Nov. 4, 2015

(65) Prior Publication Data

US 2016/0132553 A1 May 12, 2016

(30) Foreign Application Priority Data

Nov. 12, 2014 (KR) .......................... 10-2014-0157052

(51) Int. Cl.
*G06F 16/242* (2019.01)
*G06F 16/28* (2019.01)
(Continued)

(52) U.S. Cl.
CPC ........ *G06F 16/2425* (2019.01); *G06F 16/285* (2019.01); *G06F 16/90335* (2019.01); *G06F 16/9535* (2019.01); *G06F 21/6227* (2013.01)

(58) Field of Classification Search
CPC ........... G06F 17/30395; G06F 21/6227; G06F 17/30867; G06F 17/30598
(Continued)

(56) References Cited

U.S. PATENT DOCUMENTS

| 7,693,830 B2* | 4/2010 | Guha | .................. G06F 16/3338 |
| | | | 707/999.003 |
| 8,296,279 B1 | 10/2012 | Singh | |

(Continued)

FOREIGN PATENT DOCUMENTS

| KR | 10-1395518 B1 | 5/2014 |
| WO | 2008/140270 A1 | 11/2008 |
| WO | 2012-135226 A1 | 10/2012 |

OTHER PUBLICATIONS

Rathod et al., "A personalized mobile search engine based on user preference," 2017 IEEE International Conference on Power, Control, Signals and Instrumentation Engineering (ICPCSI).*

(Continued)

*Primary Examiner* — Roderick Tolentino
(74) *Attorney, Agent, or Firm* — Jefferson IP Law, LLP

(57) ABSTRACT

An electronic device is provided. The electronic device includes a memory configured to store information associated with a user, and a query managing module that is functionally connected with the memory wherein the query managing module is configured to execute acquiring a query, determining at least one word associated with the user, from the query, obtaining a result of a first search executed, based on the at least one word, from a set of protected data associated with the user, changing at least a part of the query, based on the result of the first search, and providing a result of a second search executed, based on the changed query, from a set of public data.

19 Claims, 9 Drawing Sheets

(51) Int. Cl.
*G06F 16/9535* (2019.01)
*G06F 21/62* (2013.01)
*G06F 16/903* (2019.01)

(58) Field of Classification Search
USPC .............................................. 726/2–5, 26–30
See application file for complete search history.

(56) References Cited

U.S. PATENT DOCUMENTS

| | | | |
|---|---|---|---|
| 8,577,911 B1* | 11/2013 | Stepinski | G06F 16/3325 707/765 |
| 2002/0138479 A1 | 9/2002 | Bates et al. | |
| 2006/0074883 A1 | 4/2006 | Teevan et al. | |
| 2007/0033005 A1 | 2/2007 | Cristo et al. | |
| 2007/0282811 A1* | 12/2007 | Musgrove | G06F 16/951 |
| 2007/0299844 A1 | 12/2007 | Pepper | |
| 2010/0211781 A1 | 8/2010 | Auradkar et al. | |
| 2011/0066630 A1* | 3/2011 | Balduccini | G06F 16/43 707/766 |
| 2013/0148803 A1 | 6/2013 | Jho et al. | |
| 2013/0254139 A1 | 9/2013 | Lei | |
| 2013/0262852 A1 | 10/2013 | Roeder et al. | |
| 2013/0311997 A1 | 11/2013 | Gruber et al. | |
| 2013/0326353 A1 | 12/2013 | Singhal | |
| 2013/0346396 A1* | 12/2013 | Stamm | G06F 16/9535 707/722 |
| 2014/0136517 A1 | 5/2014 | Li | |
| 2014/0164758 A1 | 6/2014 | Ramamurthy et al. | |
| 2014/0280107 A1* | 9/2014 | Heymans | G06F 16/9535 707/727 |
| 2014/0280292 A1* | 9/2014 | Skinder | G06F 16/24534 707/767 |
| 2014/0317502 A1* | 10/2014 | Brown | G06F 9/453 715/706 |
| 2014/0379696 A1* | 12/2014 | Gyongyi | G06F 16/9537 707/722 |
| 2015/0006564 A1* | 1/2015 | Tomkins | G06F 16/9535 707/767 |

OTHER PUBLICATIONS

Fu et al., "Enabling Personalized Search over Encrypted Outsourced Data with Efficiency Improvement," IEEE Transactions on Parallel and Distributed Systems Year: 2016 | vol. 27, Issue: 9 | Journal Article | Publisher: IEEE.*

* cited by examiner

APPARATUS AND METHOD FOR PROCESSING QUERY

CROSS-REFERENCE TO RELATED APPLICATION(S)

This application claims the benefit under 35 U.S.C. § 119(a) of a Korean patent application filed on Nov. 12, 2014 in the Korean Intellectual Property Office and assigned Serial No. 10-2014-0157052, the entire disclosure of which is hereby incorporated by reference.

TECHNICAL FIELD

The present disclosure relates to an electronic device. More particularly, the present disclosure relates to a method and an apparatus for processing a query.

BACKGROUND

An electronic device may provide an answer, make a recommendation, and execute an operation in response to a question asked by a user. The electronic device may deduce the intention of the user from a user input (for example, a voice command or a text input). For example, the electronic device may generate, based on the intention of the user, a query that may be executed in the electronic device, through data processing, such as a natural language process, a knowledge base, or an artificial intelligence. The electronic device may execute a query with respect to at least one data base (DB), and output a search result. The electronic device may provide, similar to that provided by a private secretary, a personal customized service by outputting a response corresponding to a request from the user, which is different depending on the taste, tendency, or context of the user.

The above information is presented as background information only to assist with an understanding of the present disclosure. No determination has been made, and no assertion is made, as to whether any of the above might be applicable as prior art with regard to the present disclosure.

SUMMARY

The personal customized service may be provided based on an intention that a user does not explicitly express or based on the context of the user. However, to accurately provide the personal customized service, a large amount of various personal information associated with a user and a large amount of various information associated with a service are required. In this regard, a user's electronic device may have difficulty in collecting or managing the information. To this end, an external service provider of the user's electronic device may collect and manage personal information of the user or various information associated with the user, in addition to the information associated with the service. The personal information of the user or various information associated with user privacy is collected by the external service provider, which is different from the electronic device of the user. Therefore, the information may leak irrespective of the personal customized service, and the user may have difficulty in managing the access right for the personal information or privacy information.

Aspects of the present disclosure are to address at least the above-mentioned problems and/or disadvantages and to provide at least the advantages described below. Accordingly, an aspect of the present disclosure is to provide method and an apparatus for processing a query.

In accordance with an aspect of the present disclosure, an electronic device for executing a search using an external device by changing a query is provided. The external device (for example, a server of a service provider) does not store and manage both a set of protected data associated with user privacy and a set of public data that is not related to the user privacy, and processes the query using only the set of public data that is not related to the user privacy.

In accordance with another aspect of the present disclosure, an electronic device is provided. The electronic device includes a memory configured to store information associated with a user, and a query managing module that is functionally connected with the memory, wherein the query managing module is configured to execute acquiring a query, determining at least one word associated with the user, from the query, obtaining a result of a first search executed, based on the at least one word, from a set of protected data associated with the user, changing at least a part of the query, based on the result of the first search, and providing a result of a second search executed, based on the changed query, from a set of public data.

In accordance with another aspect of the present disclosure, an electronic device is provided. The electronic device includes a memory configured to store information associated with a user of the electronic device, and a query managing module that is functionally connected with the memory, wherein the query managing module is configured to execute acquiring a query, obtaining a result of a first search that executes the query with respect to a set of public data, determining at least one word associated with the user, from the query, obtaining a result of a second search executed, based on the at least one word, from a set of protected data associated with the user, and changing at least a part of the result of the first search, based on the result of the second search.

An electronic device, according to various embodiments of the present disclosure, changes at least a few words associated with a user from a query input by a user into a result of executing WHAT with respect to a set of protected data associated with the user, and provides the changed query to an external service provider without providing personal information corresponding to the user's privacy to the service provider, and thus, may provide a result of the search in association with the query as a personal customized service. Also, problems that may occur with respect to another device, which is an external device of the electronic device to be used for processing a query, for example, hacking occurring in a server of a service provider, misuse of personal information, or the like, may be prevented.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
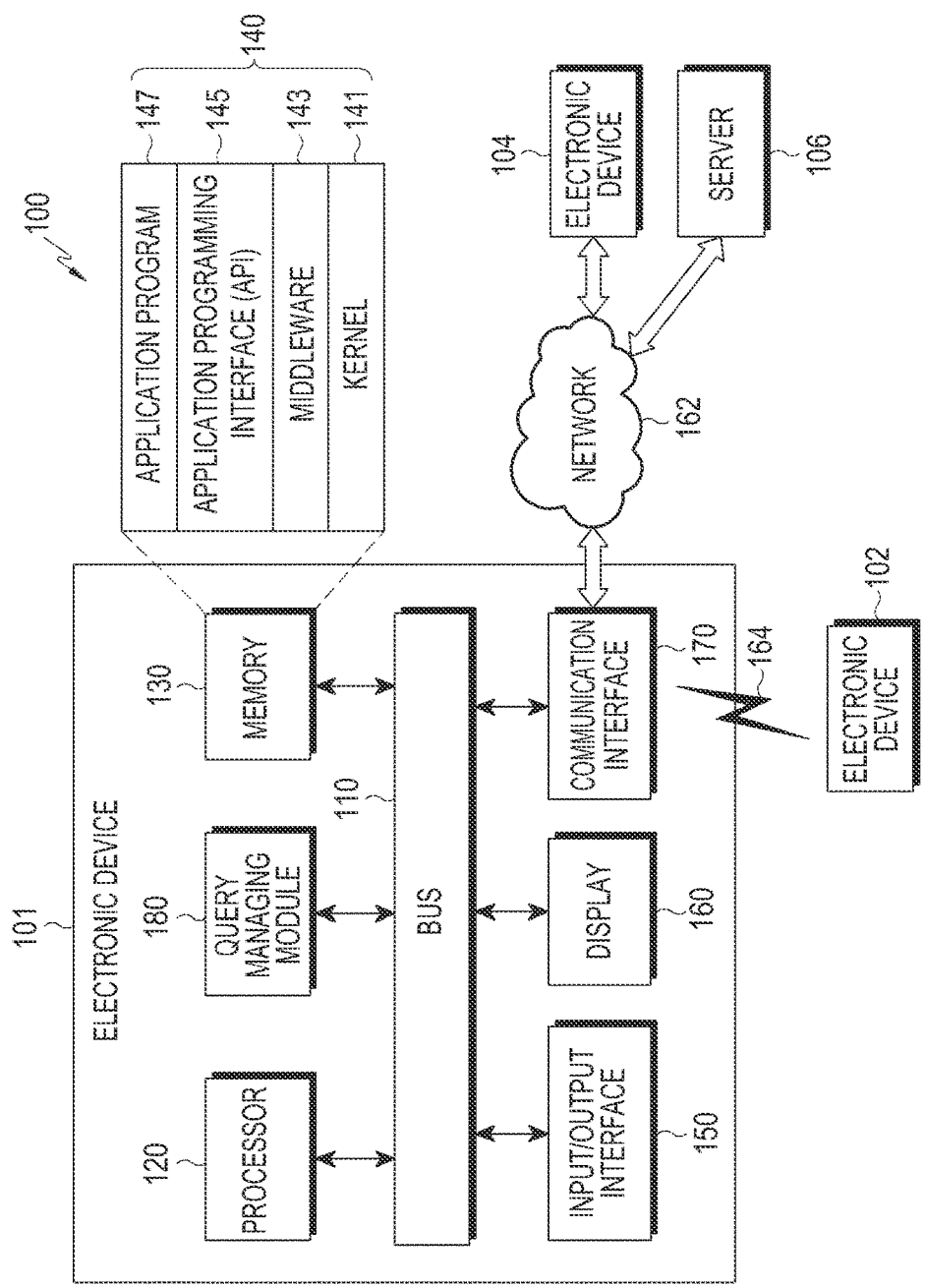
FIG. 1 illustrates a network environment that includes an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a moving picture experts group (MPEG-1 or MPEG-2) audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to some embodiments of the present disclosure, the electronic device may be a home appliance. The home appliance may include at least one of, for example, a television, a digital versatile disc (DVD) player, an audio, a refrigerator, an air conditioner, a vacuum cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (A™) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment that includes an electronic device according to various embodiments of the present disclosure.

Referring to FIG. 1, an electronic device 101 within a network environment 100, according to various embodiments of the present disclosure, will be described with reference to FIG. 1. The electronic device 101 may include a bus 110, a processor 120, a memory 130, an input/output interface 150, a display 160, a communication interface 170, and a query managing module 180. In some embodiments of the present disclosure, the electronic device 101 may omit at least one of the above components or may further include other components.

The bus 110 may include, for example, a circuit which interconnects the components 110 to 180 and delivers communication (for example, a control message and/or data) between the components 110 to 180.

The processor 120 may include one or more of a CPU, an AP, and a communication processor (CP). The processor 120, for example, may carry out operations or data processing relating to the control and/or communication of at least one other component of the electronic device 101.

The memory 130 may include a volatile memory and/or a non-volatile memory. The memory 130 may store, for example, instructions or data relevant to at least one other component of the electronic device 101. According to an embodiment of the present disclosure, the memory 130 may store software and/or a program 140. The program 140 may include, for example, a kernel 141, middleware 143, an application programming interface (API) 145, and/or application programs (or "applications") 147. At least some of the kernel 141, the middleware 143, and the API 145 may be referred to as an operating system (OS).

The kernel 141 may control or manage system resources (for example, the bus 110, the processor 120, the memory 130, or the like) used for performing an operation or function implemented in the other programs (for example, the middleware 143, the API 145, or the application programs 147). Furthermore, the kernel 141 may provide an interface through which the middleware 143, the API 145, or the application programs 147 may access the individual components of the electronic device 101 in order to control or manage the system resources.

The middleware 143, for example, may function as an intermediary for allowing the API 145 or the application programs 147 to communicate with the kernel 141 to exchange data.

In addition, the middleware 143 may process one or more task requests received from the application programs 147 according to the priorities thereof. For example, the middleware 143 may assign priorities for using the system resources (for example, the bus 110, the processor 120, the memory 130, or the like) of the electronic device 101 to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (for example, instruction) for file control, window control, image processing, or text control.

The input/output interface 150, for example, may function as an interface that may transfer instructions or data input from a user or another external device to the other component(s) of the electronic device 101. Furthermore, the input/output interface 150 may output the instructions or data received from the other component(s) of the electronic device 101 to the user or another external device.

The display 160 may include, for example, a liquid crystal display (LCD), a light emitting diode (LED) display, an organic light emitting diode (OLED) display, a micro electro mechanical system (MEMS) display, or an electronic paper display. The display 160, for example, may display various types of content (for example, text, images, videos, icons, symbols, or the like) for the user. The display 160 may include a touch screen and receive, for example, a touch, gesture, proximity, or a hovering input using an electronic pen or the user's body part.

The communication interface 170 may set communication, for example, between the electronic device 101 and an external device (for example, a first external electronic device 102, a second external electronic device 104, or a server 106). For example, the communication interface 170 may be connected to a network 162 through wireless or wired communication, and may communicate with an external device (for example, the second external electronic device 104 or the server 106). The wireless communication may use at least one of, for example, long term evolution (LTE), LTE-advance (LTE-A), code division multiple access (CDMA), wideband CDMA (WCDMA), universal mobile telecommunications system (UMTS), wireless broadband (WiBro), global system for mobile communications (GSM), and the like, as a cellular communication protocol. In addition, the wireless communication may include, for example, short range communication 164. The short-range communication 164 may include at least one of, for example, wireless fidelity (Wi-Fi), Bluetooth (BT), near field communication (NFC), GPS, and the like The wired communication may include at least one of, for example, a universal serial bus (USB), a high definition multimedia interface (HDMI), recommended standard 232 (RS-232), a plain old telephone service (POTS), and the like. The network 162 may include at least one of a communication network such as a computer network (for example, a local area network (LAN) or a wide area network (WAN), the Internet, and a telephone network.

The query managing module 180 may obtain a result of a search executed, based on a query acquired from the user, from a set of protected data (hereinafter, a protected data set) or a set of public data (hereinafter, a public data set). The query managing module 180 may change at least a part of the query based on the result. The query managing module 180 may provide a result of a search executed, based on the changed query, from the protected data set or the public data set.

Although FIG. 1 illustrates the query managing module 180 as a component configured to be independent from the processor 120 and the memory 130, various embodiments may not be limited thereto. The query managing module 180 may be embodied by being integrated with the processor 120, or may be stored in the memory in a software form, and thus, may be embodied in a form that may be executed in the processor 120. Also, the query managing module 180 may be embodied by being separated in the processor 120 and the memory 130.

At least one of the first and second external electronic devices 102 and 104 may be a type that is identical to or different from the electronic device 101. According to an embodiment of the present disclosure, the server 106 may include a group of one or more servers. According to various embodiments of the present disclosure, all or some of the operations performed in the electronic device 101 may be performed in another electronic device or a plurality of electronic devices (for example, the electronic devices 102 and 104 or the server 106).

According to an embodiment of the present disclosure, when the electronic device 101 needs to perform some functions or services automatically or in response to a request, the electronic device 101 may request another device (for example, the electronic device 102 or 104 or the server 106) to perform at least some functions relating to the functions or services, instead of or addition to performing the functions or services by itself. The other electronic device (for example, the electronic device 102 or 104 or the server 106) may carry out the requested functions or the additional functions, and may transfer the result to the electronic device 101. The electronic device 101 may process the received result as it is or additionally in order to provide the requested functions or services. To this end, for example, cloud computing, distributed computing, or client-server computing technology may be used.

Figure 2:
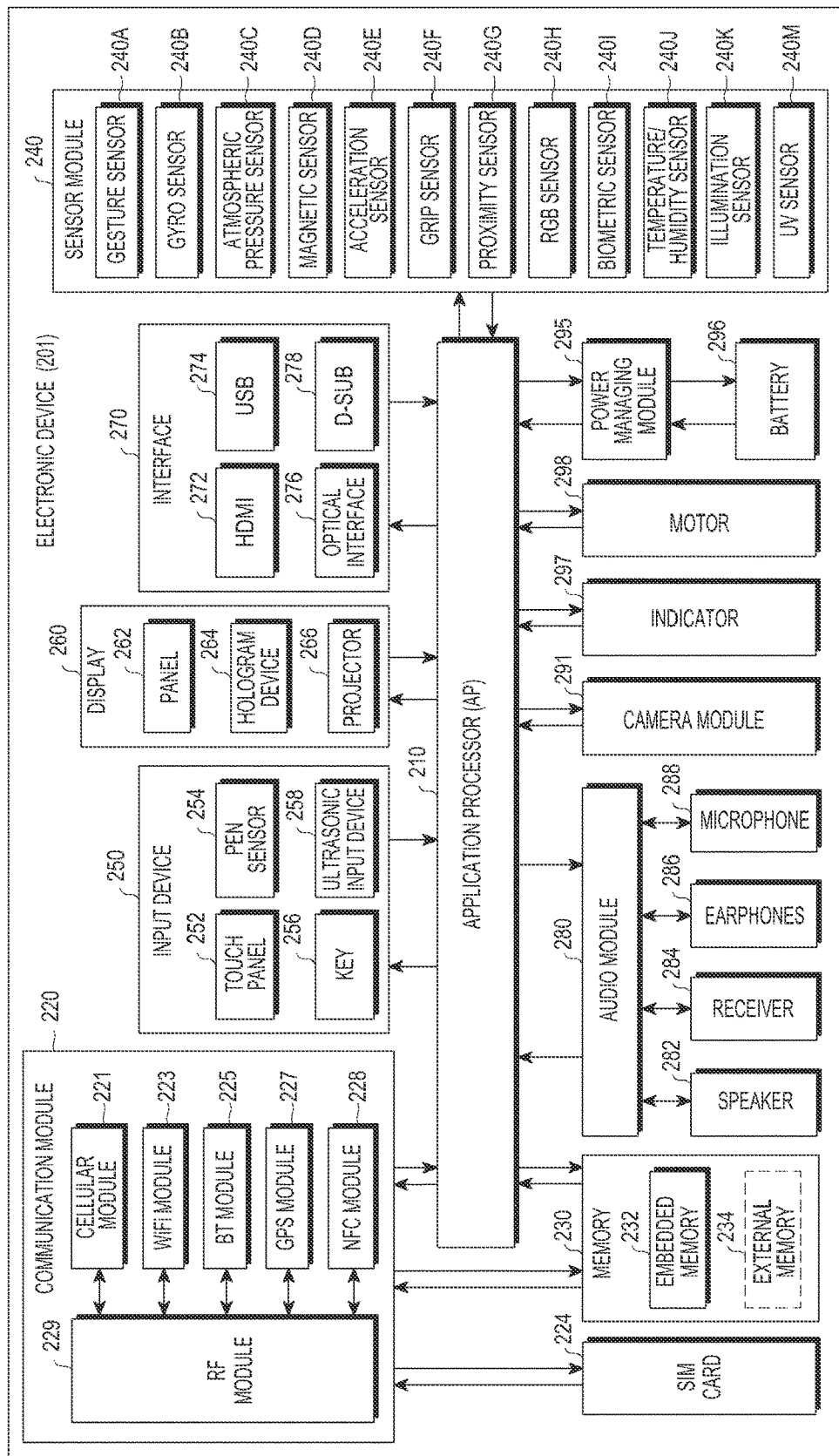
FIG. 2 is a block diagram of an electronic device according to various embodiments of the present disclosure.

FIG. 2 is a block diagram of an electronic device according to various embodiments of the present disclosure.

Referring to FIG. 2, the electronic device 201 may include the whole or a part of the electronic device 101 illustrated in FIG. 1. The electronic device 201 may include at least one AP 210, a communication module 220, a subscriber identification module (SIM) 224, a memory 230, a sensor module 240, an input device 250, a display 260, an interface 270, an audio module 280, a camera module 291, a power managing module 295, a battery 296, an indicator 297, and a motor 298.

The processor 210 may control a plurality of hardware or software components connected to the processor 210 by driving an OS or an application program, and may perform processing of various pieces of data and calculations. The processor 210 may be embodied as, for example, a system on chip (SoC).

According to an embodiment of the present disclosure, the processor 210 may further include a graphic processing unit (GPU) and/or an image signal processor. The processor 210 may include at least some (for example, a cellular module 221) of the components illustrated in FIG. 2. The processor 210 may load, into a volatile memory, instructions or data received from at least one (for example, a non-volatile memory) of the other components and may process the loaded instructions or data, and may store various data in a non-volatile memory.

The communication module 220 may have a configuration identical or similar to that of the communication interface 170 of FIG. 1. The communication module 220 may include, for example, a cellular module 221, a Wi-Fi module 223, a BT module 225, a GPS module 227, an NFC module 228, and a radio frequency (RF) module 229.

The cellular module 221 may provide a voice call, a video call, a text message service, Internet services, or the like through, for example, a communication network. According to an embodiment of the present disclosure, the cellular module 221 may distinguish and authenticate the electronic device 201 within a communication network using a subscriber identification module (for example, the SIM card 224). According to an embodiment of the present disclosure, the cellular module 221 may perform at least some of the functions that the processor 210 may provide. According to an embodiment of the present disclosure, the cellular module 221 may include a CP.

At least one of the Wi-Fi module 223, the BT module 225, the GPS module 227, and the NFC module 228 may include a processor for processing, for example, data transmitted or received through a corresponding module.

According to an embodiment of the present disclosure, at least some (two or more) of the cellular module 221, the Wi-Fi module 223, the BT module 225, the GPS module 227, and the NFC module 228 may be included in one integrated chip (IC) or IC package.

The RF module 229 may transmit/receive, for example, a communication signal (for example, an RF signal). The RF module 229 may include, for example, a transceiver, a power amplifier module (PAM), a frequency filter, a low noise amplifier (LNA), and an antenna.

According to another embodiment of the present disclosure, at least one of the cellular module 221, the Wi-Fi module 223, the BT module 225, the GPS module 227, and the NFC module 228 may transmit/receive an RF signal through a separate RF module.

The subscriber identification module 224 may include, for example, a card including a subscriber identity module and/or an embedded SIM, and may include unique identification information (for example, an integrated circuit card identifier (ICCID)) or subscriber information (for example, an international mobile subscriber identity (IMSI)).

The memory 230 (for example, the memory 130) may include, for example, an internal memory 232 or an external memory 234. The internal memory 232 may include at least one of a volatile memory (for example, a dynamic random access memory (DRAM), a static RAM (SRAM), a synchronous dynamic RAM (SDRAM), and the like) and a non-volatile memory (for example, a one time programmable read only memory (OTPROM), a programmable ROM (PROM), an erasable and programmable ROM (EPROM), an electrically erasable and programmable ROM (EEPROM), a mask ROM, a flash ROM, a flash memory (for example, a NAND flash memory or a NOR flash memory), a hard disc drive, a solid state drive (SSD), and the like).

The external memory 234 may further include a flash drive, for example, a compact flash (CF), a secure digital (SD), a micro-SD, a mini-SD, an eXtreme digital (xD), a multi-media card (MMC), a memory stick, or the like. The external memory 234 may be functionally and/or physically connected to the electronic device 201 through various interfaces.

The sensor module 240 may measure a physical quantity or detect an operation state of the electronic device 201, and may convert the measured or detected information into an electric signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red/green/blue (RGB) sensor), a biometric sensor 240I, a temperature/humidity sensor 240J, an illumination sensor 240K, and an ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein.

According to an embodiment of the present disclosure, the electronic device 201 may further include a processor configured to control the sensor module 240, as a part of the processor 210 or separately from the processor 210, and may control the sensor module 240 while the processor 210 is in a sleep mode.

The input device 250 may include, for example, a touch panel 252, a (digital) pen sensor 254, a key 256, or an ultrasonic input device 258. The touch panel 252 may use at least one of, for example, a capacitive type, a resistive type, an infrared type, and an ultrasonic type. Also, the touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic waves generated by an input tool through a microphone (for example, a microphone 288) and identify data corresponding to the detected ultrasonic waves.

The display 260 (for example, the display 160) may include a panel 262, a hologram device 264 or a projector 266. The panel 262 may include a configuration identical or similar to the display 160 illustrated in FIG. 1. The panel 262 may be embodied to be, for example, flexible, transparent, or wearable. The panel 262 and the touch panel 252 may be embodied as one module. The hologram 264 may show a three dimensional image in the air by using interference of light. The projector 266 may display an image by projecting light onto a screen. The screen may be located, for example, inside or outside the electronic device 201.

According to an embodiment of the present disclosure, the display 260 may further include a control circuit for controlling the panel 262, the hologram device 264, or the projector 266.

The interface 270 may include, for example, a HDMI 272, a USB 274, an optical interface 276, or a D-subminiature (D-sub) 278. The interface 270 may be included in, for example, the communication interface 170 shown in FIG. 1. Additionally or alternatively, the interface 270 may include, for example, a Mobile High-definition Link (MHL) interface, a SD card/MMC interface, or an infrared data association (IrDA) standard interface.

The audio module 280 may bilaterally convert, for example, a sound and an electric signal. At least some components of the audio module 280 may be included in, for example, the input/output interface 150 illustrated in FIG. 1. The audio module 280 may process sound information that is input or output through, for example, a speaker 282, a receiver 284, earphones 286, the microphone 288 or the like.

The camera module 291 is, for example, a device capable of capturing a still image and a moving image. According to an embodiment of the present disclosure, the camera module 291 may include one or more image sensors (for example, a front sensor or a back sensor), a lens, an image signal processor (ISP), and a flash (for example, an LED, a xenon lamp, or the like).

The power managing module 295 may manage, for example, the power of the electronic device 201. According to an embodiment of the present disclosure, the power managing module 295 may include a power management integrated circuit (PMIC), a charger integrated circuit (IC), or a battery or fuel gauge. The PMIC may use a wired and/or wireless charging method. Examples of the wireless charging method may include, for example, a magnetic resonance method, a magnetic induction method, an electromagnetic method, and the like. Additional circuits for wireless charging, for example, a coil loop, a resonance circuit, a rectifier, and the like, may be further included. The battery gauge may measure, for example, a residual quantity of the battery 296, and a voltage, a current, or the temperature during the charging. The battery 296 may include, for example, a rechargeable battery and/or a solar battery.

The indicator 297 may display a particular state of the electronic device 201 or a part (for example, the processor 210) of the electronic device 201, for example, a booting state, a message state, a charging state, or the like. The motor 298 may convert an electrical signal into mechanical vibration, and may generate vibration, a haptic effect, or the like. Although not illustrated, the electronic device 201 may include a processing unit (for example, a GPU) for supporting a mobile TV. The processing unit for supporting the mobile TV may process, for example, media data pursuant to a certain standard of digital multimedia broadcasting (DMB), digital video broadcasting (DVB), media flow, or the like.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments of the present disclosure may be combined into one entity, which may perform functions identical to those of the relevant components before the combination.

Figure 3:
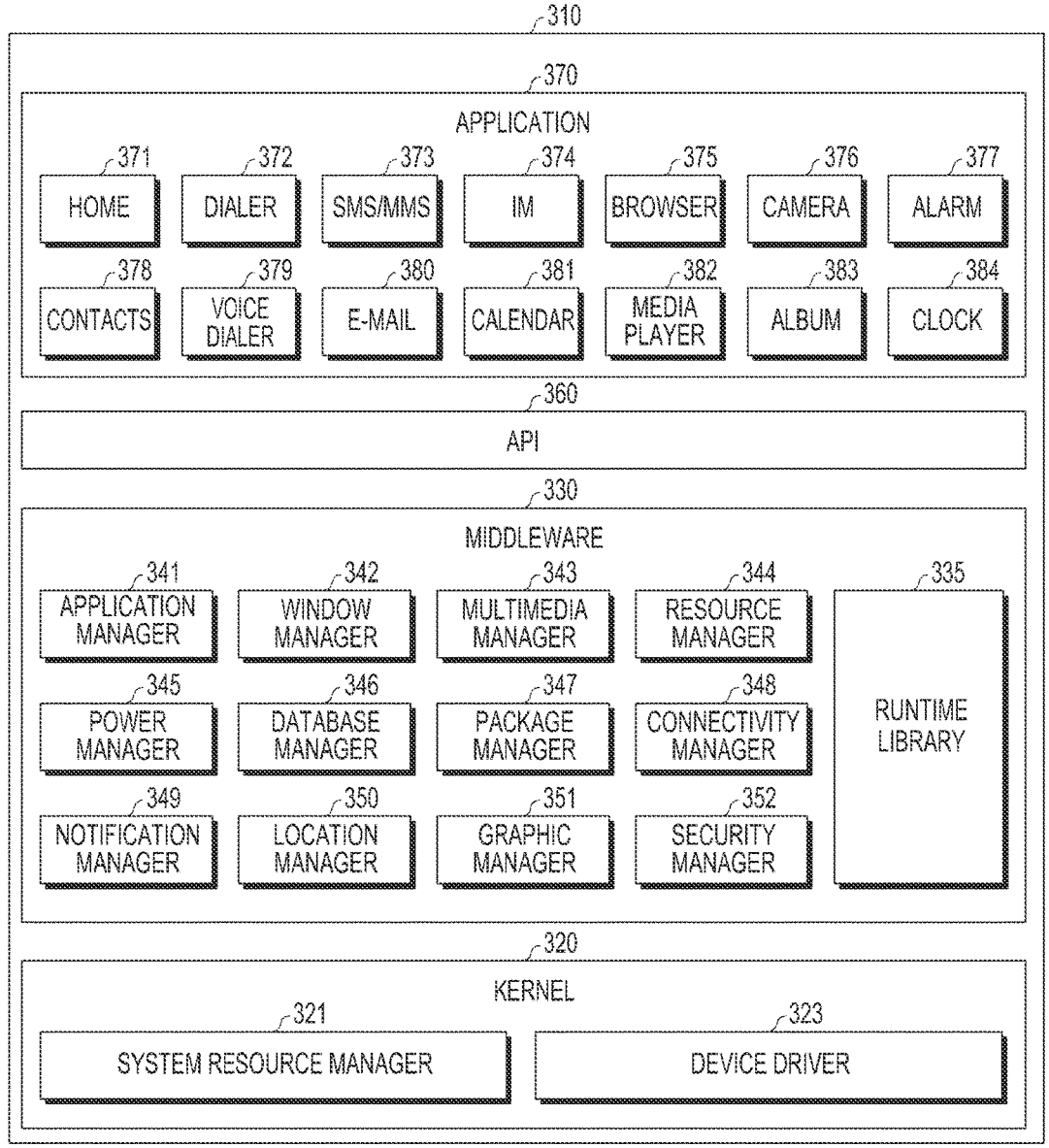
FIG. 3 is a block diagram of a program module of an electronic device according to various embodiments of the present disclosure.

FIG. 3 is a block diagram of a program module according to various embodiments of the present disclosure.

Referring to FIG. 3, the program module 310 (for example, the program 140) may include an OS for controlling resources related to an electronic device (for example, the electronic device 101) and/or various applications (for example, the application programs 147) executed in the OS. The OS may be, for example, Android, iOS, Windows, Symbian, Tizen, Bada, or the like.

The program module 310 may include a kernel 320, middleware 330, an API 360, and/or an application 370. At least some of the program module 310 may be preloaded on an electronic device, or may be downloaded from an external electronic device (for example, the electronic device 102 or 104, or the server 106).

The kernel 320 (for example, the kernel 141) may include, for example, a system resource manager 321 and/or a device driver 323. The system resource manager 321 may perform the control, allocation, retrieval, or the like of system resources. According to an embodiment of the present disclosure, the system resource manager 321 may include a process manager, a memory manager, a file system manager, or the like. The device driver 323 may include, for example, a display driver, a camera driver, a BT driver, a shared memory driver, a USB driver, a keypad driver, a Wi-Fi driver, an audio driver, or an inter-process communication (IPC) driver.

For example, the middleware 330 may provide a function required in common by the applications 370, or may provide various functions to the applications 370 through the API 360 so as to enable the applications 370 to efficiently use the limited system resources in the electronic device. According to an embodiment of the present disclosure, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a complier uses to add a new function by using a programming language during the execution of the application 370. The runtime library 335 may perform input/output management, memory management, the functionality associated with an arithmetic function, or the like.

The application manager 341 may manage, for example, the life cycle of at least one of the applications 370. The window manager 342 may manage graphical user interface (GUI) resources used for the screen. The multimedia manager 343 may determine a format required to reproduce various media files, and may encode or decode a media file using a coder/decoder (codec) appropriate for the relevant format. The resource manager 344 may manage resources, such as a source code, a memory, a storage space, and the like of at least one of the applications 370.

The power manager 345 may operate together with, for example, a basic input/output system (BIOS) or the like, so as to manage a battery or power, and may provide power information required for the operation of an electronic device. The database manager 346 may generate, search for, and/or change a database (DB) to be used by at least one of the applications 370. The package manager 347 may manage the installation or update of an application distributed in the form of a package file.

The connectivity manager 348 may manage a wireless connection, for example, Wi-Fi, BT, or the like. The notification manager 349 may display or notify of an event, such as an arrival message, an appointment, a proximity notification, and the like, in such a manner as not to disturb a user. The location manager 350 may manage the location information of an electronic device. The graphic manager 351 may manage a graphic effect, which is to be provided to a user, or a user interface related to the graphic effect. The security manager 352 may provide various security functions required for system security, user authentication, and the like. According to an embodiment of the present disclosure, when an electronic device (for example, the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Also, the middleware 330 may dynamically delete some of the existing components, or may add new components.

The API 360 (for example, the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (for example, the application programs 147) may include, for example, one or more applications that may provide functions such as a home 371, a dialer 372, an short message service (SMS)/multimedia messaging service (MMS) 373, an instant message (IM) 374, a browser 375, a camera 376, an alarm 377, contacts 378, a voice dialer 379, an email 380, a calendar 381, a media player 382, an album 383, a clock 384, health care (for example, measure exercise quantity or blood sugar), or environment information (for example, atmospheric pressure, humidity, or temperature information).

According to an embodiment of the present disclosure, the applications 370 may include an application (hereinafter, referred to as an "information exchange application" for convenience of description) supporting exchanging information between an electronic device (for example, the electronic device 101) and an external electronic device (for example, the electronic device 102 or 104). The application associated with exchanging information may include, for example, a notification relay application for forwarding specific information to an external electronic device, or a device management application for managing an external electronic device.

For example, the notification relay application may include a function of delivering, to the external electronic device (for example, the electronic device 102 or 104), notification information generated by other applications (for example, an SMS/MMS application, an email application, a health care application, an environmental information application, and the like) of the electronic device. Further, the notification relay application may receive notification information from, for example, the external electronic device, and may provide the received notification information to a user.

The device management application may manage (for example, install, delete, or update), for example, at least one function (for example, turning on/off an external electronic device itself (or some component parts thereof) or adjusting the brightness (or resolution) of the display) of the external electronic device (for example, the electronic device 102 or 104) communicating with an electronic device, an application executed in the external electronic device, or a service (for example, a telephone call service, a message service, or the like) provided in the external electronic device.

According to an embodiment of the present disclosure, the applications 370 may include applications (for example, a health care application of a mobile medical appliance or the like) designated according to attributes of an external electronic device 102 or 104. According to an embodiment of the present disclosure, the applications 370 may include an application received from an external electronic device (for example, the server 106, or the electronic device 102 or 104). According to an embodiment of the present disclosure, the applications 370 may include a preloaded application or a third party application, which may be downloaded from a server. Names of the components of the program module 310, according to the above-described embodiments of the present disclosure, may change depending on the type of OS.

According to various embodiments of the present disclosure, at least some of the program module 310 may be implemented in software, firmware, hardware, or a combination of two or more thereof. At least some of the program module 310 may be implemented (for example, executed) by, for example, the processor (for example, the processor 210). At least some of the program module 310 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments of the present disclosure, at least some of the devices (for example, modules or functions thereof) or the method (for example, operations) according to embodiments of the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a compact disc ROM (CD-ROM) and a DVD), magneto-optical media (e.g., a floptical disk), a hardware device (e.g., a ROM, a RAM, a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to embodiments of the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Further, the embodiments disclosed in this document are only for the description and understanding of technical contents and do not limit the scope of the present disclosure. Accordingly, the scope of the present disclosure should be construed as including all modifications or various other embodiments based on the technical idea of the present disclosure.

Figure 4:
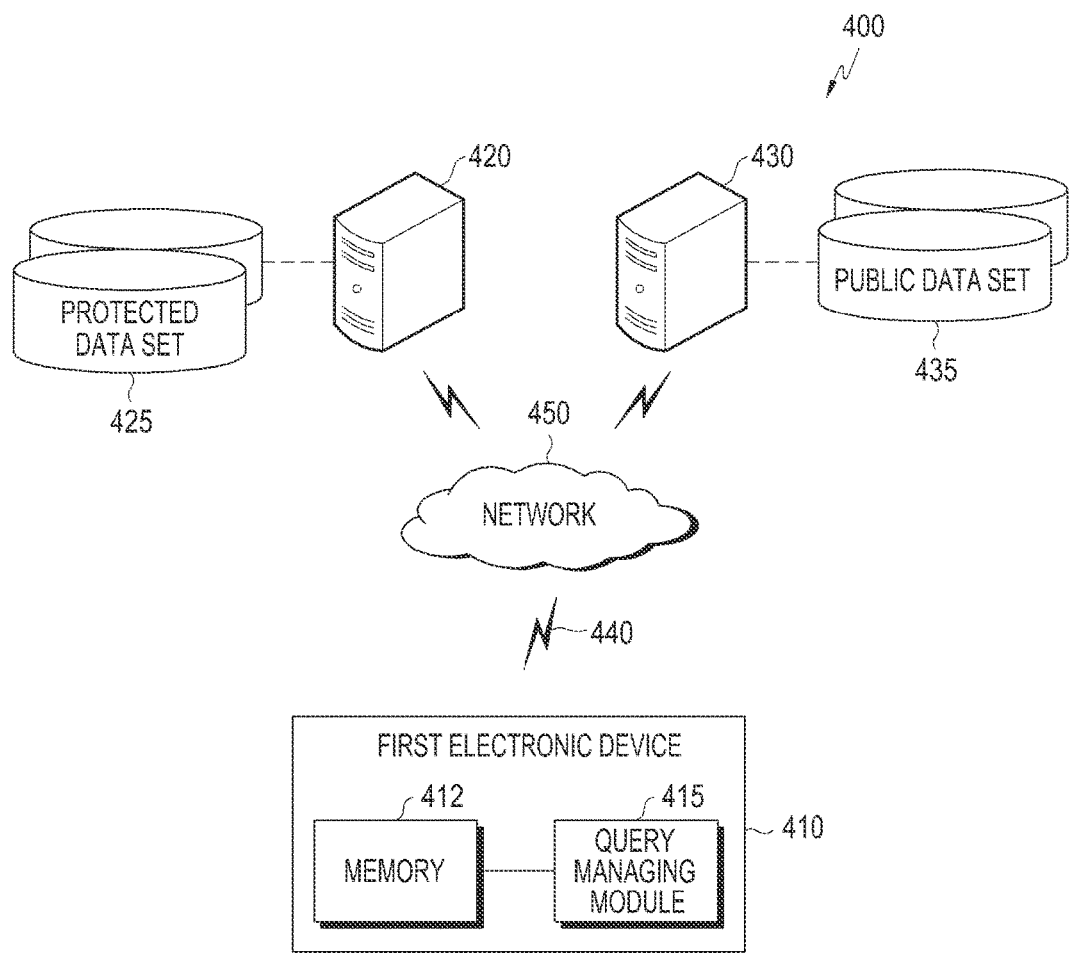
FIG. 4 illustrates a query processing system according to various embodiments of the present disclosure.

FIG. 4 illustrates a query processing system according to various embodiments of the present disclosure.

Referring to FIG. 4, the query processing system 400 may include, for example, a first electronic device 410 (for example, the electronic device 101), a second electronic device 420 (for example, the electronic device 102 or 104, or the server 106), and a third electronic device 430 (for example, the electronic device 102 or 104, or the server 106).

According to an embodiment of the present disclosure, the first electronic device 410 may include, for example, a memory 412 and a query managing module 415. The memory 412 may store, for example, information associated with a user of the first electronic device 410. The query managing module 415 may execute, for example, a series of processing associated with a query of a user, and may provide the user with a response to the query, based on a result of the processing.

According to an embodiment of the present disclosure, a query may be defined as a language or a statement written in the language, which is defined to process a user command in association with data stored in a DB. Alternatively, the query may include a user input (for example, a voice command) for executing a request from a user in an electronic device. For example, the electronic device (for example, the first electronic device 410) may receive a request (for example, a voice command or a text input) from the user through the application 370 (for example, a private secretary application). The request or an input that is converted into a form that may execute the corresponding request in an electronic device may be defined as a query.

According to an embodiment of the present disclosure, the query managing module 415 acquires a query, for example, from the user, and may determine at least one word associated with the user from the query acquired from the user based on information associated with the user, which is stored in the memory 412. The information associated with the user may include a set of keywords which is used for extracting that words or phrases associated with the user from the acquired query. For example, a word (for example, 'I,' 'me,' 'my,' or the like) that is deduced to be associated with a user, or the like, may be included. The query managing module 415 may obtain a result of a search in association with at least a part of the acquired query, which is executed from at least a part of a set 425 of protected data and at least a part of a set 435 of public data. According to an embodiment of the present disclosure, the search in association with the at least a part of the acquired query may be executed from the protected data associated with the user out of the protected data set 425 or the protected data set. The query managing module 415 may change at least a part of the query obtained from the user, based on the search result. Through the following descriptions with reference to FIG. 5, additional information associated with the query managing module 415 will be provided.

According to an embodiment of the present disclosure, the second electronic device 420 may include, for example, the protected data set 425. The protected data set 425 may be a set of protected data (for example, an encrypted DB) that is configured to allow access based on authentication of a user. The protected data set 425 may store one or more pieces of data associated with user privacy. For example, the protected data may include health information (for example, height, weight, blood pressure, or eyesight), medical information (medical transcription, chronic illness, prescription, or medication), financial information (a bank, an account, a breakdown of card use), household information (items stored in a refrigerator or items of daily necessities required to be purchased), and personal information (hobby, tendency, or a field of interest). At least a part of the health information, medical information, financial information, household information, and personal information may be input or measured by the first electronic device 410, and may be stored in the DB of the first electronic device 410 or another electronic device (for example, the server 106).

According to an embodiment of the present disclosure, the protected data set 425 may include a plurality of pieces of protected data and/or a plurality of protected data sets, and each piece of protected data or each protected data set may be stored in different (physically different) electronic devices (for example, the first electronic device 410 or the electronic device 420). For example, the protected data corresponding to the health information from among the protected data set 425 may be obtained through an application (for example, a health application) executed in the first electronic device 410, and may be stored in the first electronic device 410 or a server (for example, the second electronic device 420). The protected data corresponding to the household information from among the protected data set 425 may be stored in another electronic device (for example, the electronic device 104) or another server (for example, the server 106), through a home gateway.

According to an embodiment of the present disclosure, the second electronic device 420 may include, for example, a personal local storage, a cloud storage, a user data storage of a third service (for example, a hospital, a bank, or a shopping mall), or a home gateway.

According to an embodiment of the present disclosure, the third electronic device 430 may store, for example, the public data set 435. The public data set 435 may be a set of public data, storing data that does not require separate authentication. The third electronic device 430 may include, for example, a search engine server. The public data set 435 may include a set of public data that may be accessed through a general search engine without separate authentication.

According to an embodiment of the present disclosure, the public data set 435 may include a plurality of pieces of public data and/or a plurality of public data sets. For example, the public data set 435 may include information that may be accessed through a first search engine and/or information that may be accessed through a second search engine. Also, each piece of public data or each public data set may be stored in different (physically different) electronic devices (for example, the first electronic device 410 or the electronic device 430).

According to an embodiment of the present disclosure, the first electronic device 410 may connect to a network 450 (for example, the network 162) through wireless communication 440, so as to communicate with the second electronic device 420 (for example, the electronic device 104) or the third electronic device 430 (for example, the electronic device 106). The first electronic device 410 may access a data set stored in at least one of the second electronic device and the third electronic device 430, through the wireless communication 162, or may transmit a query associated with the corresponding data set and receive a response to the corresponding query.

Although, for the ease of description, the first electronic device 410 is described as a single device, the first electronic device 410 may include a plurality of electronic devices (for example, the electronic device 102 or 104, or the server 106) according to various embodiments. The plurality of electronic devices may implement functions of at least a part of the first electronic device 410. Additional description associated with the plurality of electronic devices will be provided with reference to FIG. 6.

Figure 5:
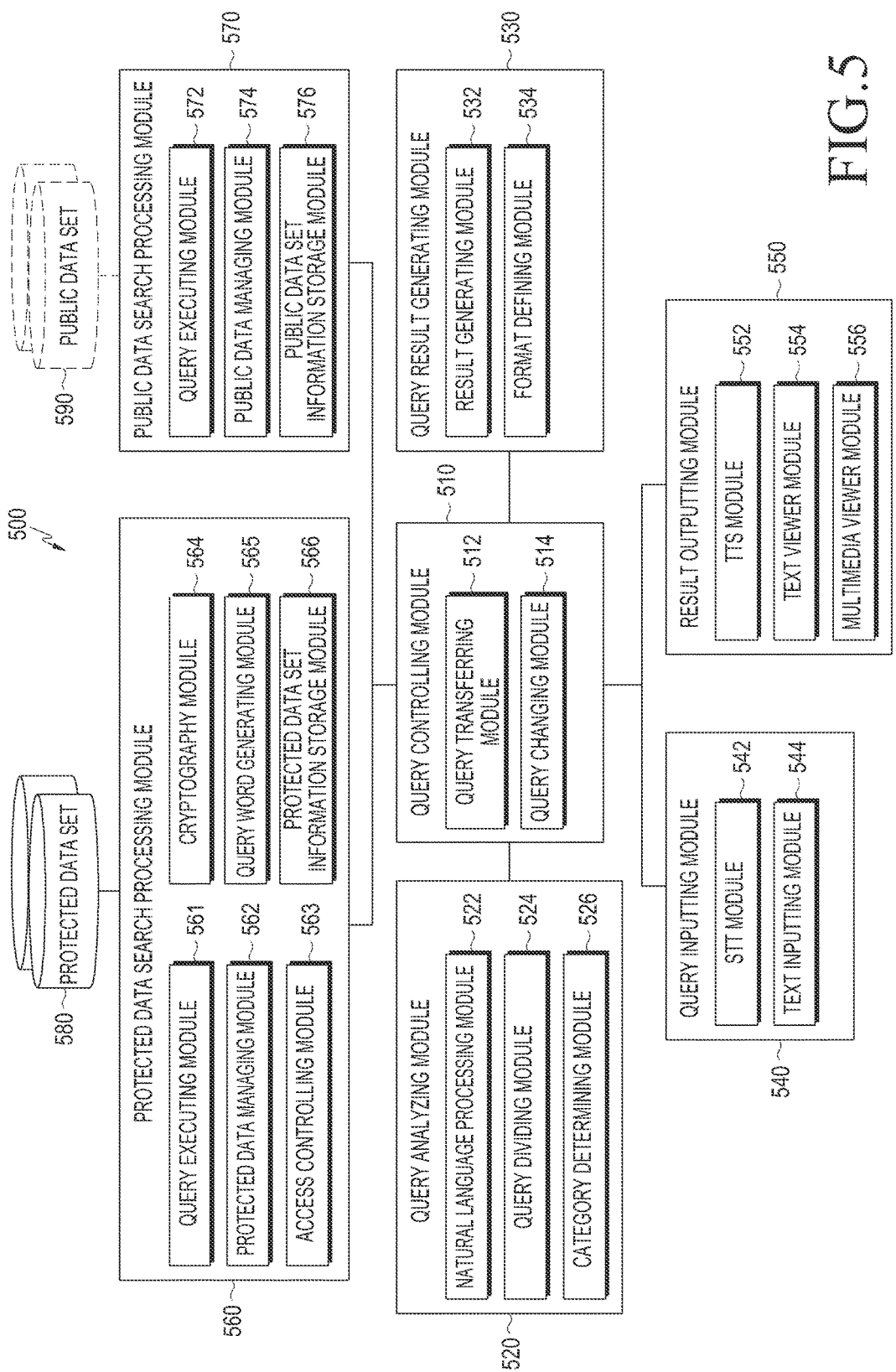
FIG. 5 illustrates a query managing module of an electronic device according to various embodiments of the present disclosure.

FIG. 5 illustrates a query managing module (for example, the query managing module 415) of an electronic device (for example, the electronic device 101 or 410) according to various embodiments of the present disclosure.

Referring to FIG. 5, the query managing module 500 may include, for example, one of a query controlling module 510, a query analyzing module 520, a query result generating module 530, a query inputting module 540, a result outputting module 550, a protected data search processing module 560, a public data search processing module 570, and a protected data set 580, or a combination of at least two of them. According to an embodiment of the present disclosure, the query managing module 500 may omit at least one of the component elements 510 to 580, or may additionally include another component element. According to an embodiment of the present disclosure, the query managing module 500 may be configured to execute only a few functions of the component elements, and the remaining functions may be executed by other modules excluding the query managing module 500 or another electronic device that is an external device of the electronic device.

According to an embodiment of the present disclosure, the query controlling module 510 may include, for example, a query transferring module 512 and a query changing module 514. The query controlling module 510 may transfer a query to each module so as to provide a response to the request input by a user, and may control executing or processing the query. According to an embodiment of the present disclosure, the query transferring module 512 may transfer a query to the query analyzing module 520, and may receive a result of the analysis by the query analyzing module 520. The query transferring module 512 may transfer at least a part of the query to a correspond module so as to execute the query with respect to a public data set 590 or the protected data set 425 and 580, based on the result of the analysis. For example, the query transferring module 512 may determine a part (for example, 'the condition of my body,' 'a prescription drug,' 'movie that is watched,' 'way back home from work') associated with the protected data set 425 or 580 from the query, for example, through the analyzing module 520. The determined part is a query to be executed with respect to corresponding protected data out of the protected data set 425 or 580 (for example, 'DB associated with health,' 'DB associated with medical,' or 'DB associated with activity information of a user'), and may be transferred to the protected data search processing module 560.

Also, for example, the query transferring module 512 may transfer at least a part (for example, food good for high blood pressure) of the query (for example, a query received from the user) to the public data search processing module 570, as a query that is to be executed with respect to the public data.

According to an embodiment of the present disclosure, the query changing module 514 may change at least a part of the query (for example, the query received from the user) based on a result of the query executed in the protected data set 580. For example, the query changing module 514 may change at least a part of the query based on a result of the execution of the query received from the protected data search processing module 560. The query transferring module 512 may transfer a result received from the public data search processing module 570 to the query result generating module 530, so as to provide a result of the execution of the query. Also, the query changing module 514 may change at least a part of the query based on the result of the execution of the query received from the public data search processing module 570.

According to an embodiment of the present disclosure, the query analyzing module 520 may include, for example, a natural language processing module 522, a query dividing module 524, or a category determining module 526. The natural language processing module 522 may generate a query that may be executed in an electronic device (for example, the electronic device 101 or 410), using a natural language process, a knowledge base or an artificial intelligence, based on the request obtained from the user (for example, a natural language-based voice command). For example, the natural language processing module 522 may analyze the query (for example, a request obtained from the user) transferred from the query controlling module 510, and may recognize a syntax form of the query or a meaning of phrases or words forming the query.

According to an embodiment of the present disclosure, the query dividing module 524 may divide the query based on the meaning of words or phrases forming the query. For example, the query may be divided into at least one sub-query. Whether the phrase or word determined by the natural language processing module 522 is a query associated with the protected data set 580 or a query associated with the public data set 590 may be determined. For example, whether the query is associated with the user may be determined by determining whether a previously registered predetermined keyword (for example, 'I,' 'me,' 'my,' or the like) that is stored in a memory (for example, the memory 412) exists. The category determining module 526 may determine a category by determining whether a sub-query obtained from the query dividing module 524 is identical or similar to a phrase or a word defined as a predetermined keyword.

According to an embodiment of the present disclosure, the query result generating module 530 may include, for example, a result generating module 532 or a format defining module 534. The result generating module 532 may provide the user with a result of the execution of the query. The result generating module 532 may process the result based on a format defined by the format defining module 532, and may enable the result outputting module 550 to display the same through a display (for example, the display 160) of the electronic device (for example, the electronic device 101). The format defining module 534 may define a format associated with a result to be provided, based on an application that is currently executed in the electronic device (for example, the electronic device 101 or 410). The format defining module 534 may process the result based on the corresponding format.

According to an embodiment of the present disclosure, the query inputting module 540 may include, for example, a speech-to-text (STT) module 542 or a text inputting module 544. The STT module 542 may convert an input received in the form of voice into the form of text. The text inputting module 544 may receive an input in the form of text.

According to an embodiment of the present disclosure, the result outputting module 550 may include, for example, a text-to-speech (TTS) module 552, a text viewer module 554, or a multimedia viewer module 556. The TTS module 552 may convert the result of the execution of the query from the form of text into the form of voice. The text viewer module 554 may display the result of the execution of the query, in the form of text. The multimedia viewer module 556 may display the result of the execution of the query in the form of multimedia (for example, audio, video, or hologram).

According to an embodiment of the present disclosure, the protected data search processing module 560 may include, for example, a query executing module 561, a protected data managing module 562, an access controlling module 563, a cryptography module 564, a query word generating module 565, or a protected data set information storage module 566.

According to an embodiment of the present disclosure, the query executing module 561 may select protected data in which the query is to be executed out of the protected data set, with reference to the protected data set information storage module 566. The query executing module 561 may execute a query with respect to the selected protected data.

According to an embodiment of the present disclosure, the protected data managing module 562 may manage information associated with a list of the protected data set used by the user, a data storing method, an access right controlling method, or an encrypting method. For example, when a category of a word associated with the user obtained from the query is determined by the category determining module 562, the protected data managing module 562 may determine an application or protected data that manages the word associated with the user, based on the corresponding category.

According to an embodiment of the present disclosure, the access controlling module 563 may manage an access controlling method for accessing each piece of protected data stored in the protected data set. For example, an authentication code required for accessing corresponding protected data may be generated by determining an access method in association with the desired protected data, through the protected data managing module 562. The authentication code may be different for each piece of protected data. The authentication code may be arbitrarily selected by a user or a system designer.

According to an embodiment of the present disclosure, the access controlling module 563 may be configured as, for example, access right information or an authentication code generator. The access right information may store authentication information (for example, identification (ID), a password, an authentication certificate, or a secret key) that allows access to protected data. The authentication code generator may generate an authentication code that allows access to protected data, based on the access right information. The access right information may be included in the protected data set information storage module 566. When an access method corresponding to a category determined by the category determining module 526 requires authentication of a higher level than the previously executed authentication, the category determining module 526 may request the authentication of a higher level.

According to an embodiment of the present disclosure, the cryptography module 564 may encrypt at least a part of a query to be executed with respect to protected data, by determining an encrypting method in association with the desired protected data through the protected data managing module 562. The cryptography module 564 may decode a result of the execution of the query of which at least a part is encrypted.

According to an embodiment of the present disclosure, the query word generating module 565 may determine a query to be executed with respect to the protected data. Based on a type of the determined protected data, to obtain a result of a search by executing a query, a field value that is used in the corresponding protected data should be used to execute the query. For example, based on at least a part of a query that is transferred from the query controlling module 510, at least one query word (a word corresponding to a field value of the determined protected data) may be generated or selected, which is to be used for executing a query in the protected data set 580.

For example, the query word generating module 565 may obtain, from the query controlling module 510, at least one word (body condition) associated with the protected data set 580 from the query (for example, 'What is good food for my body condition?') input by the user. The query word generating module 565 may determine, based on the at least one word, a field value (for example, 'health') that is actually used in protected data as a query word (for example, 'health') so that the query may be executed with respect to the protected data (for example, 'S-Health' application DB). The protected data to which the query is to be executed, may be determined by the protected data managing module 562. In the above example, the query executing module 561 may execute a search from 'S-health' application DB which is the protected data determined by the protected data managing module 562, using 'health' which is the query word determined by the query generating module 565.

According to an embodiment of the present disclosure, the query word generating module 565 may extend the query to be executed with respect to the protected data set 580, based on at least a part of the query which is transferred from the query controlling module 510. For example, the word, 'body condition,' may be extended to query words (for example, 'health,' 'body condition,' the 'number of steps,' or the like) which are stored for the execution of a query with respect to the protected data corresponding to a category determined by the category determining module 526. Alternatively, a type of a query (for example, structured query language (SQL) query) corresponding to the protected data determined by the protected data managing module 562 may be determined. According to an embodiment of the present disclosure, the query word generating module 565 may be included in the query controlling module 510, but this may not be limited thereto. According to an embodiment of the present disclosure, the protected data set information storage module 566 may store information associated with protected data stored in the protected data set 580. The protected data managing module 562 may determine a location where each piece of protected data is stored, an access method and an encryption scheme, using the protected data set information storage module 566. For example, when the protected data associated with the user includes health information and financial information, which of an application or a DB should be accessed to access the health information or the financial information may be determined through the protected data set information storage module 566. Also, the protected data set information storage module 566 may include information associated with an encryption scheme required by each application or each DB.

According to an embodiment of the present disclosure, the public data search processing module 570 may include, for example, a query executing module 572, a public data managing module 574, or a public data set information storage module 576. The query executing module 572 may select public data to which a query is to be executed out of the public data set 590, with reference to the public data set information storage module 576. The query executing module 572 may execute a query with respect to the selected public data.

The public data managing module 574 may manage information associated with a list of the public data set 590 or information associated with a data storing method. The public data set information storage module 576 may store information associated with public data which is stored in the public data set 590. The information associated with the public data may include a list of search engines, for example, Naver, Google, or the like.

According to an embodiment of the present disclosure, the query inputting module 540 or the result outputting module 550 may be configured as a separate electronic device. For example, although an electronic device that a user always carries (for example, a portable terminal (for example, a smart phone or a tablet PC) or a wearable device (for example, a smart watch or smart glasses) is capable of executing the function of the query inputting module 540 or the result outputting module 550, this may not be limited thereto.

According to an embodiment of the present disclosure, the protected data search processing module 560 or the public data search processing module 570 may be configured as a separate electronic device. For example, although an external electronic device (for example, the server 106) may execute the function of the protected data search processing module 560 or the public data search processing module 570, this may not be limited thereto. Although the protected data search processing module 560 may be executed in a first external device and the public data search processing module 570 may be executed in a second external device, the present disclosure may not be limited thereto.

Referring to FIG. 5, although the query controlling module 510, the query analyzing module 520, the query result generating module 530, the query inputting module 540, the result outputting module 550, the protected data search processing module 560, the public data search processing module 570, or the protected data set 580 are illustrated as separate blocks, the electronic device (the electronic device 101 or 410) may be configured as at least a part of the components, that is, the query controlling module 510, the query analyzing module 520, the query result generating module 530, the query inputting module 540, the result outputting module 550, the protected data search processing module 560, the public data search processing module 570, or the protected data set 580, or may be configured as a single module including the component elements. Also, although the components may be included in a plurality of different electronic devices, the present disclosure may not be limited thereto.

According to an embodiment of the present disclosure, the public data search processing module 570 may additionally or alternatively include one or more modules that execute functions similar to one or more modules included in the protected data search processing module. For example, the public data search processing module 570 may further include one or more modules (not illustrated) that execute functions similar to the cryptography module 564, the query word generating module 565, and the access controlling module 563. The public data set 590, as illustrated in FIG. 5, may be included in the electronic device (for example, the electronic device 101 or 410) that includes the query managing module 500 (for example, the query managing module 415), or may be included (for example, stored) in an external device of the electronic device (for example, an external server (for example, the server 106) that provides a search engine based on web). Other embodiments of the present disclosure may be possible. For example, the external device (for example, the server 106) that stores or manages the public data set 590 may receive a request for execution of a query associated with the public data set 590 from the electronic device (the electronic device 101 or 410), and may execute the corresponding query. Alternatively, the electronic device may receive a part of the public data set 590 from the external device and store the same, thereby executing the query associated with the public data set 590 in the electronic device.

Figure 6:
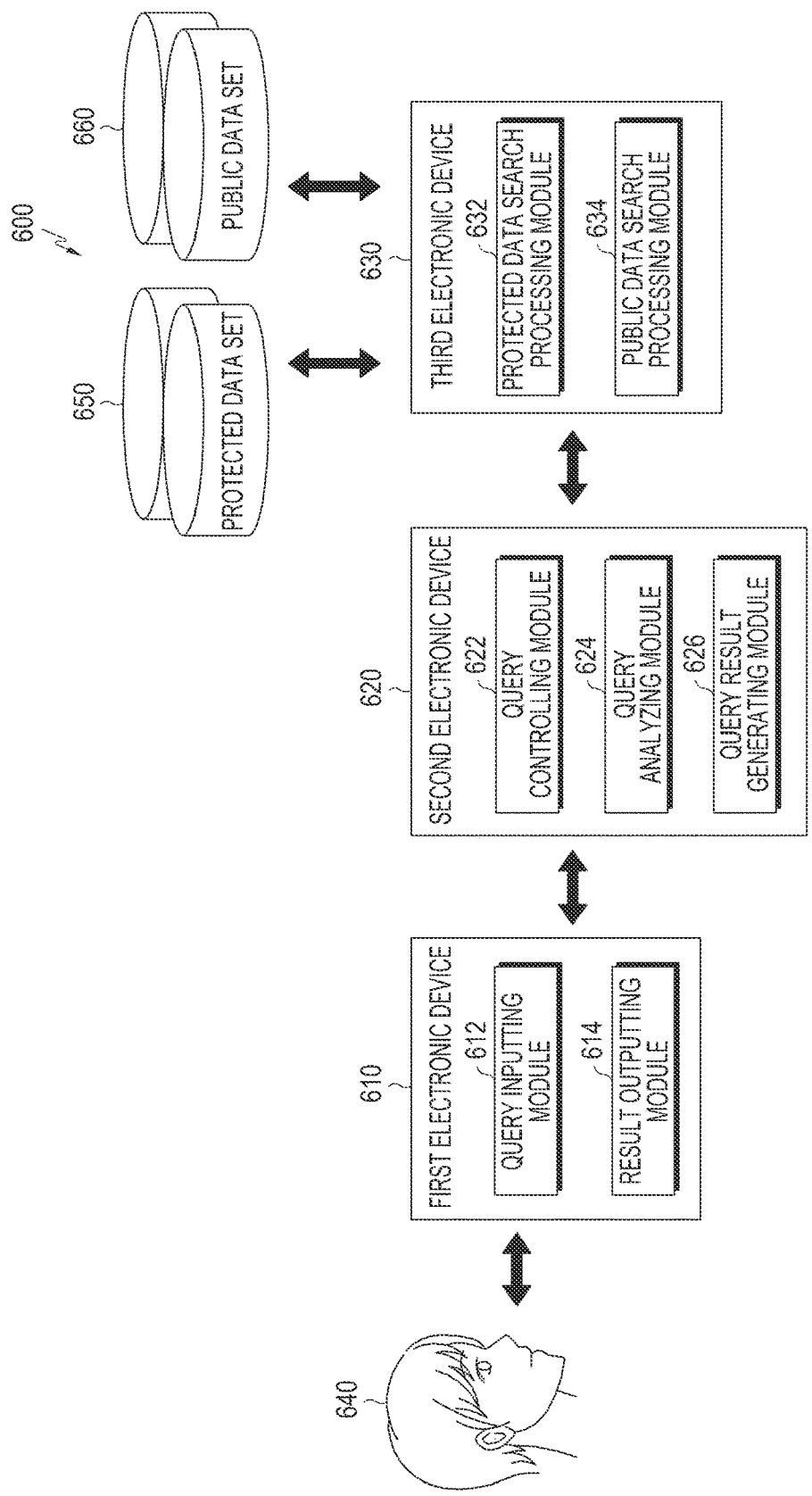
FIG. 6 illustrates an example of a query processing system that processes a request from a user according to various embodiments of the present disclosure.

FIG. 6 illustrates an example of a query processing system that processes a request from a user according to various embodiments of the present disclosure.

Referring to FIG. 6, the query processing system 600 may include, for example, a first electronic device 610, a second electronic device 620, a third electronic device 630, a protected data set 650, and a public data set 660.

According to an embodiment of the present disclosure, the first electronic device 610 (for example, a smart phone, a wearable device, or the electronic device 102), may include, for example, a query inputting module 612 or a result outputting module 614. The first electronic device 610 may receive a request (for example, a voice command or a text input) from a user 640, through the query inputting module 612. For example, the user 640 may input a request in the form of a natural language, such as "What is good food for my body condition?", through the query inputting module 612 of the first electronic device 610.

According to an embodiment of the present disclosure, the first electronic device 610 may transfer an input (for example, a voice command) obtained from the user 640 to the second electronic device 620, through wireless communication or short range communication. The second electronic device 620 may include, for example, a query controlling module 622, a query analyzing module 624, or a query result generating module 626. The query analyzing module 624 of the second electronic device 620 may analyze a query transferred from the first electronic device 610, and may transfer the query to the third electronic device 630 so as to execute the corresponding query with respect to the protected data set 650 or the public data set 660, which corresponds to the query. The third electronic device 630 (for example, the server 106) may include, for example, the protected data search processing module 632 or the public data search processing module 634. The third electronic device 630 may execute a query with respect to the protected data set 650 or the public data set 660, which corresponds to the query, and may transfer a result of the execution to the second electronic device 620.

According to an embodiment of the present disclosure, the query processing system 600 may execute at least a part of the query (for example, the request input by the user) in the protected data set 650, and may change at least a part of the query based on a result of the execution, and execute the changed query in the public data set 660.

According to an embodiment of the present disclosure, the query inputting module 612 of the first electronic device 610 may change the request (query) in the form of voice, which is input by the user 640, into a query in the form of text. The first electronic device 610 may transfer the query in the form of text to the second electronic device 620.

The second electronic device 620 may analyze the syntax form of the query, and a meaning of a phrase or a word forming the query through, for example, the query analyzing module 624 (for example, the natural language processing module 522). The query analyzing module 624 of the second electronic device 620 may divide the query into one or more sub-queries through the analysis. Referring to Table 1 provided below, the query analyzing module 624 of the second electronic device 620 may determine a category of a corresponding sub-query.

TABLE 1

| ID | Category | Keyword |
| --- | --- | --- |
| 1 | Health | body, weight, blood type, blood pressure, health, pulse |
| 2 | Finance | salary, money, expense, spend, card |
| 3 | Travel | trip, travel, photo |

According to an embodiment of the present disclosure, the query "What is good food for my body condition" may be divided into sub-queries, 'my body condition' and 'What is good food for ~'. The query analyzing module 624 of the second electronic device 620 may recognize that the query is associated with the user 640, from, for example, the word 'my' in the phrase 'my body condition'. The query analyzing module 624 of the second electronic device 620 may determine a category of the sub-query 'my body condition.' The corresponding sub-query may correspond to, for example, the category 'health,' Also, the second electronic device 620 may determine that the corresponding category corresponds to protected data corresponding to 'health' of the protected data set 650.

According to an embodiment of the present disclosure, the query controlling module 622 of the second electronic device 620 may transmit, to the third electronic device 630, a command for executing the query in the protected data set 650 of the corresponding category.

According to an embodiment of the present disclosure, referring to Table 2 provided below, the protected data search processing module 632 of the third electronic device 630 may determine an access controlling method in association with the protected data corresponding to 'health.' The protected data search processing module 632 of the third electronic device 630 may execute a user authentication procedure (for example, login or exchanging authentication), so as to access protected data. The protected data search processing module 632 of the third electronic device 630 may determine an encrypting method in association with the protected data, and may execute the corresponding encryption procedure. When a query of which protected data is encrypted is received, protected data search processing module 632 of the third electronic device 630 may encrypt at least a part of the corresponding query using a corresponding encryption key and an encryption algorithm.

TABLE 2

| ID | Category | Access controlling method | Encryption algorithm |
|---|---|---|---|
| 1 | health | OAuth | AES 128 |
| 2 | finance | Certification | AES 216 |
| 3 | travel | OpenID | — |

According to an embodiment of the present disclosure, the protected data search processing module 632 of the third electronic device 630 may execute a query with respect to the protected data in the 'health' category (for example, health application DB) based on at least one word associated with the user 640. The third electronic device 630 may obtain a result of the execution of the query. For example, based on the sub-query 'my body condition,' a result of the execution of a query using the word 'blood pressure' with respect to the protected data of the 'health' category (for example, health application DB), may be obtained. For example, when a result of taking blood pressure of the user through the health application is stored as 'high blood pressure,' 'high blood pressure' may be obtained as a result of the execution of the query. The third electronic device 630 may transfer the result of the execution of the query (for example, 'high blood pressure') to the second electronic device 620.

According to an embodiment of the present disclosure, the query controlling module 622 of the second electronic device 620 may change at least a few words or a value of the result of the execution of the query, into other words or another value. For example, when the result of the execution of the query is raw data (for example, blood pressure of 163/92) which is different from a single phrase such as 'high blood pressure,' the raw data may be changed into a single phrase such as 'high blood pressure' using a third service (for example, a medical service or a blood pressure measuring service).

According to an embodiment of the present disclosure, the query controlling module 622 of the second electronic device 620 may change at least a part of the query (for example, 'What is good food for my body condition?') based on the result of the execution of the query (for example, 'high blood pressure'). For example, the part corresponding to 'my body condition' may be changed into 'high blood pressure.' The changed query may be 'What is good food for high blood pressure?'. The query controlling module 622 of the second electronic device 620 may transfer, to the third electronic device 630, a command for executing the changed query with respect to the public data set 660.

According to an embodiment of the present disclosure, the public data search processing module 634 of the third electronic device 630 may obtain a result of the execution of the changed query with respect to the public data set 660. The third electronic device 630 may transfer the result of the execution of the changed query, to the second electronic device 620.

According to an embodiment of the present disclosure, the query result generating module 626 of the second electronic device 620 may execute processing so as to display the result of the execution of the changed query, and may transfer the same to the first electronic device 610. The result outputting module 550 of the first electronic device 610 may provide the result that is processed to be displayed, to the user 640.

According to an embodiment of the present disclosure, the query processing system 600 may execute at least a part of the query (for example, the request input by the user) in the public data set 660, and independently or in parallel, may execute at least a part of the query in the protected data set 650. The query processing system 660 may change at least a part of the result of a search executed in the public data set 660 based on the result of a search executed in the protected data set 650.

According to an embodiment of the present disclosure, the second electronic device 620 may analyze a query obtained from the user 640, through the query analyzing module 624. For example, by analyzing the structure of a sentence of the query, the second electronic device 620 may divide the query into two or more sub-queries. Also, which of the two or more sub-queries is to be executed may be determined by determining the structure or sequence of the sentence, or a sub-query that is placed in front of a question mark. The second electronic device 620 may preferentially execute a query with respect to the public data set 660, based on the result of the analysis. The second electronic device 620 may additionally execute a query with respect to the protected data set 650, using the result of the execution of the query with respect to the public data set 660.

According to an embodiment of the present disclosure, the public data search processing module 634 of the third electronic device 630 may obtain a first search result by executing a query input by the user 640, with respect to the public data set 660. The query analyzing module 624 of the second electronic device 620 may determine at least one word associated with the user 640, from the query (for example, the request obtained from the user) that is transferred from the first electronic device 610. The protected data search processing module 632 of the third electronic device 630 may obtain a second search result by executing a search in association with at least one word, from protected data associated with the user 640, which is determined based on the protected data set information storage module 566 of the protected data managing module 562, out of the protected data set 650. The query controlling module 622 of the second electronic device 620 may change at least a part of the first search result based on the second search result. The result outputting module 614 of the first electronic device 610 may provide the changed result to the user 640.

According to an embodiment of the present disclosure, the first electronic device 610 may receive a query "recommend to me some gifts for a man in his 40's" from the user 640. The second electronic device 620 may obtain a search result by executing the corresponding query with respect to the public data set 660. The second electronic device 620 may determine at least one word (for example, gifts) associated with the user from the corresponding query. For example, when a word including the possibility of spending money, such as a 'restaurant,' a 'car,' a 'present,' or the like is included in the query that is input, the word may be determined as a word that is associated with the user. The third electronic device 630 may obtain financial information of the user from the protected data associated with 'finance' (for example, bank balance, credit card bill, or credit limit) out of the protected data set 650, through the word 'gifts.' For example, the protected data associated with 'finance' may be obtained from a bank, a credit card company, and a financial company. The query controlling module 622 of the second electronic device 620 may change at least a part of the result obtained by executing a search from the public data set 660, based on a result of a search executed from the protected data set 650. For example, an order of the items in the result of the search executed from the public data set 660 (for example, a result of recommendation of a present for man in 40's) may be changed based on the result of the search (for example, financial information of a user) executed from the protected data set 650. The result outputting module 614 of the first electronic device 610 may provide the changed result to the user 640.

According to an embodiment of the present disclosure, the query processing system 600 may execute at least a part of the query (for example, the request input by the user) in the public data set 660, and may change at least a part of the query based on a result of the execution, and execute the changed query in the protected data set 650. The query inputting module 612 of the first electronic device 610 may receive inputting a query "what movies have I seen starring Yoon Ji-min?" The query analyzing module 624 of the second electronic device 620 may divide the corresponding query into sub-queries "What are the movies starring Yoon Ji-min?" and "Which movies have I seen?" The query analyzing module 624 of the second electronic device 620 may obtain a search result by executing a sub-query corresponding to 'What are the movies starring Yoon Ji-min7' with respect to the public data set 660, through the public data search processing module 634 of the third electronic device 630. For example, when the search result is 'Inception, Fight Club, and Tenacious-D,' the query controlling module 622 of the second electronic device 620 may change at least a part of the query based on the corresponding search result. The query controlling module 622 of the second electronic device may obtain a search result by executing the changed query (for example, Which movies have I seen among inception, fight club and tenacious-D?) with respect to the protected data set 650 through the protected data search processing module 632 of the third electronic device 630. The result outputting module 614 of the first electronic device 610 may provide the changed result to the user 640.

According to various embodiments of the present disclosure, the electronic device (for example, the electronic device 410) may include a memory (for example, the memory 412) for storing information associated with a user, and a query managing module (for example, the query managing module 415) that is functionally associated with the memory. The query managing module may be configured to obtain a query, to determine at least one word associated with the user from the query, to obtain a result of a first search executed, based the at least one word, from protected data set associated with the user, to change at least a part of the query based on the result of the first search, and to provide a result of a second search executed, based on the changed query, from the public data set.

According to various embodiments of the present disclosure, the query managing module may be configured to obtain the query through an external device of the electronic device.

According to various embodiments of the present disclosure, the query managing module may be configured to execute an encryption algorithm with respect to the protected information set, based on the at least one word.

According to various embodiments of the present disclosure, the query managing module may be configured to transmit the at least one word to an external device, and to obtain the result of the first search in response to the transmission.

According to various embodiments of the present disclosure, the result of the first search includes a plurality of items, and the query managing module may be configured to change the query based on an item selected out of the plurality of items based on an input from the user.

According to various embodiments of the present disclosure, the query managing module may be configured to determine whether context information associated with the electronic device satisfies a designated condition.

According to various embodiments of the present disclosure, the query managing module may be configured to determine a word indicating the user to be the at least one word.

According to various embodiments of the present disclosure, the query managing module may be configured to change at least a part of the query when a word indicating the user does not exist in the query.

According to various embodiments of the present disclosure, the protected data set may include one or more pieces of data associated with the privacy of the user, which is configured to allow access based on the authentication of the user.

According to various embodiments of the present disclosure, the query managing module may be configured to determine a category of the protected data set from which the first search is to be executed, based on a category of the at least one word. According to various embodiments of the present disclosure, the first search may be executed using at least one of an access method and an encryption algorithm, which corresponds to the determined category, from among a plurality of access methods or a plurality of encryption algorithms corresponding to a plurality of different protection levels.

According to various embodiments of the present disclosure, the query managing module may be configured to transmit a request for the first search to an external device of the electronic device, and to obtain the result of the first search in response to the request.

According to various embodiments of the present disclosure, the query managing module may be configured to generate another query based on the at least one word, to transmit the other query to an external device, and to obtain the result of the first search in response to the response to the other query.

According to various embodiments of the present disclosure, the query managing module may be configured to change at least a few words or a value of the result of the first search into other words or another value.

According to various embodiments of the present disclosure, the electronic device (for example, the electronic device 410) may include a memory (for example, the memory 412) for storing information associated with the user of the electronic device, and a query managing module (for example, the query managing module 415) that is functionally connected with the memory. The query managing module may be configured to obtain a query, to obtain a result of a first search by executing the query with respect to the public data set, to determine at least one word associated with the user from the query, to obtain a result of a second search executed from the protected data set associated with the user, based on the at least one word, and to change at least a part of the result of the first search based on the result of the second search.

According to various embodiments of the present disclosure, the query managing module may be configured to determine a category of the protected data set, from which the second search is to be executed, based on a category of the at least one word.

Figure 7:
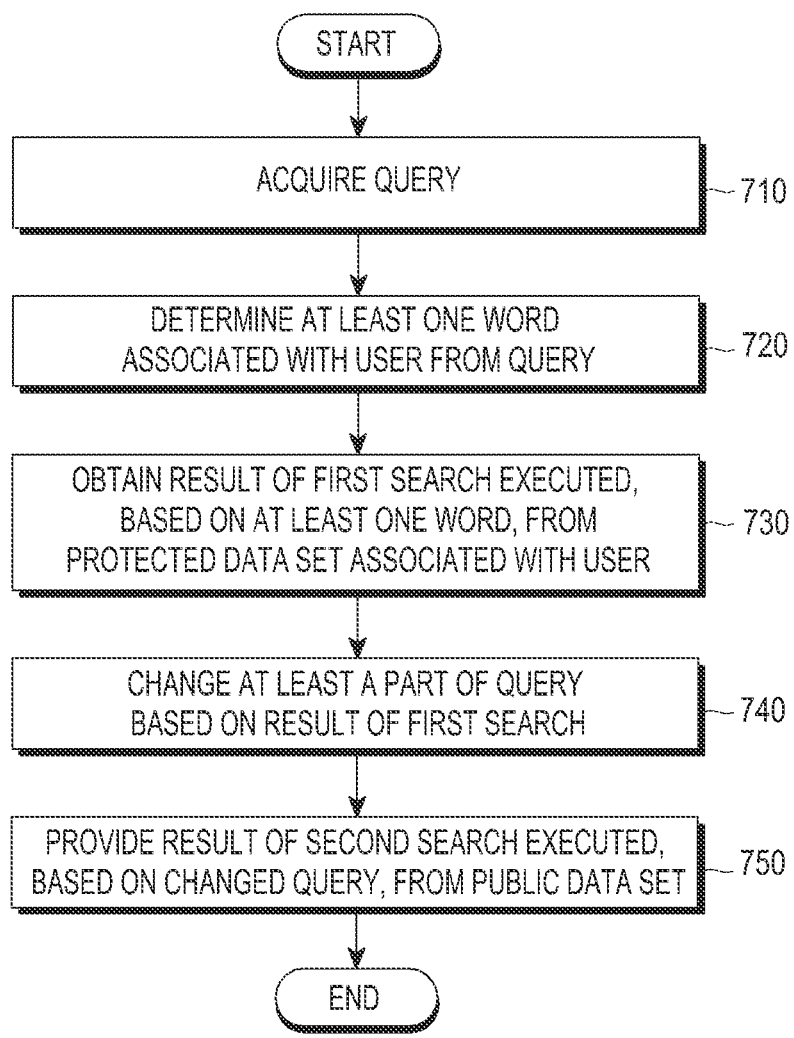
FIG. 7 is a flowchart illustrating a query processing method of an electronic device according to various embodiments of the present disclosure.

FIG. 7 is a flowchart illustrating a query processing method of an electronic device (for example, the electronic device 101 or 410) according to various embodiments of the present disclosure.

Referring to FIG. 7, in operation 710, the electronic device acquires a query. The query may be acquired through a request that a user inputs through the electronic device. Alternatively, when context information associated with the electronic device satisfies a designated condition, the query may be obtained. For example, when a hospital transmits the prescription to the electronic device and a prescription receiving event occurs in the electronic device, a query may be generated based on the corresponding event. The electronic device may obtain a query, which is input through an external device (for example, a wearable device that the user wears or a smart phone), but the present disclosure may not be limited thereto.

In operation 720, the electronic device determines at least one word associated with the user, from the query. For example, when it is determined that a predetermined keyword exists by analyzing the query that is input by the user, a sub-query including the corresponding keyword may be determined to be at least one word associated with a protected data set.

According to an embodiment of the present disclosure, when the word associated with the user does not exist, the structure of a sentence may be changed or words or phrases forming a sentence, paragraphs, or the like may be rearranged, using a natural language process, a knowledge base, or an artificial intelligence. For example, when a query "Does the medicine prescribed yesterday include any steroid component?" is acquired, the sentence may be changed into 'Does the medicine that I way prescribed yesterday include any steroid component?' The electronic device (for example, the electronic device 101 or 410) may recognize that a sub-query 'the medicine that I way prescribed yesterday' in the reconfigured query is information associated with the privacy of the user.

In operation 730, the electronic device (for example, the electronic device 101 or 410) obtains a result of a search executed, based on at least one word, from the protected data set associated with the user. For example, a category of 'medical' may be determined by determining a category of the sub-query 'the medicine that I was prescribed yesterday'. The electronic device may obtain a result of a query executed, based on the word 'medicine', in at least one protected data corresponding to the 'medical' category in the protected data set. For example, the result of the query may be 'medicine for rhinitis (loratadine).'

In operation 740, the electronic device (for example, the electronic device 101 or 410) changes at least a part of the query, based on the search result. For example, the part corresponding to 'the medicine prescribed yesterday' may be changed into 'medicine for rhinitis (loratadine)'. The changed query may be 'Does medicine for rhinitis (loratadine) include any steroid component?'

In operation 750, the electronic device (the electronic device 101 or 410) provides a result of a search executed from the public data set, based on the changed query. The electronic device may provide the result of the search to the user.

According to an embodiment of the present disclosure, the electronic device (the electronic device 101 or 410) may execute a query at least two times with respect to the protected data set 425 or the public data set 435. The electronic device may obtain a query from a user or another electronic device (for example, the electronic device 102).

The electronic device may determine a plurality of sub-queries associated with the protected data set, from the query. For example, when a query "What should I buy for dinner on my way home from word, and where?" is acquired, the query may be divided into a sub-query "What should I buy for dinner?" and a sub-query "Where should I buy on my way home from work?"

According to an embodiment of the present disclosure, the electronic device (for example, the electronic device 101 or 410) may execute a query with respect to the protected data (for example, assumption information obtained through a home gateway) associated with a category of 'food', based on the word 'dinner'. For example, when the protected data associated with the category of 'food' is a storage that stores the items, which are stored in a refrigerator, through a home gateway, the food (for example, spaghetti alio olio) that can be made from the ingredients included in the refrigerator, may be determined. The electronic device may change the former sub-query from 'What should I buy for dinner?' into 'What should I buy for spaghetti alio olio?'

According to an embodiment of the present disclosure, it is recognized that the latter sub-query is associated with the protected data set called 'on my way home from word' which corresponds to activity information of the user. The electronic device may execute the corresponding query with respect to the associated protected data, and obtain associated information (for example, a route or a transportation). For example, the electronic device may change the latter sub-query from ' on my way home from work' to 'from Seocho-dong to Yatap-dong by bus?'

According to an embodiment of the present disclosure, the electronic device may obtain a result of the execution of the changed query with respect to the public data set. The electronic device may provide the obtained result to the user.

Figure 8:
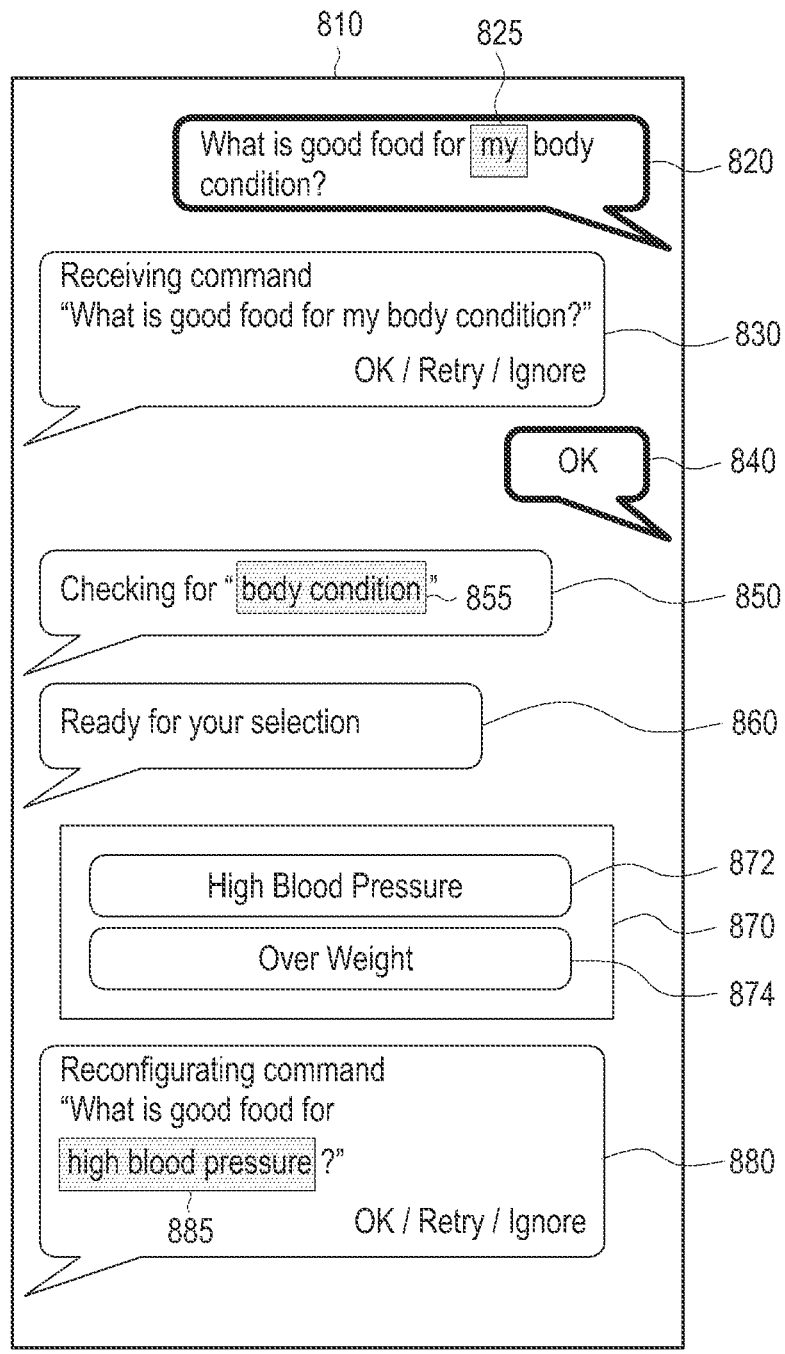
FIG. 8 illustrates a user interface (UI) in association with a method of processing a query of an electronic device, according to various embodiments of the present disclosure.

FIG. 8 illustrates a user interface (UI) in association with a method of processing a query of an electronic device according to various embodiments of the present disclosure.

Referring to FIG. 8, the UI 810 may be provided through an application 370 of the electronic device (for example, the electronic device 101 or 410).

According to an embodiment of the present disclosure, a user of the electronic device (for example, the electronic device 101 or 410) may input a request (for example, input a voice command) through the application 370 (for example, a private secretary application). For example, a request 820 "What is good food for my body condition?" may be input. The command input by the user may be displayed through the UI 810. The electronic device may display a confirmation message 830 so as to determine whether the obtained input is identical to the request input by the user. The user may input a response 840 in response to the confirmation message 830.

According to an embodiment of the present disclosure, the electronic device (for example, the electronic device 101 or 410) may determine at least one word associated with the user, from the request input by the user. For example, it is recognized that a sub-query 855 'my body condition' is related to the protected data associated with the user, based on a word 825 'my'. The electronic device may execute a query with respect to the protected data associated with the user based on the sub-query 855 'body condition', and may obtain a result thereof. The electronic device (for example, the electronic device 101 or 410) may display a message 850 indicating that the sub-query 855 is currently executed.

According to an embodiment of the present disclosure, the obtained result may include a plurality of items. The electronic device (for example, the electronic device 101 or 410) may display a message 860 indicating that an input from the user is required. The electronic device may display a plurality of items 870, and obtain an item desired by the user from among the plurality of items 870 through a user input. For example, in association with 'body condition' of the user, the result of the execution of the query with respect the protected data set may include 'high blood pressure' 872 and 'over weight' 874.

According to an embodiment of the present disclosure, the electronic device (for example, the electronic device 101 or 410) may change the query, based on an item selected out of the plurality of items based on the user input. For example, when the user selects the 'high blood pressure' 872, the electronic device may change the part of 'my body condition' into 'high blood pressure?' so as to change the query "What is good food for my body condition?" into 'What is good food for high blood pressure?'

According to an embodiment of the present disclosure, although the electronic device (for example, the electronic device 101 or 410) is capable of generating a plurality of changed queries based on the plurality of items, the present disclosure may not be limited thereto. For example, when the plurality of items are 'high blood pressure' 872 and 'over weight' 874, the query "What is good food for high blood pressure?" and the query 'What is good food for over weight?' may be generated and thus, a result of the execution of each query with respect to the public data may be obtained.

According to an embodiment of the present disclosure, the electronic device (for example, the electronic device 101 or 410) may display a message 880 for determining whether the query changed based on the user input is identical to the intention of the user. For example, the electronic device may display the message 880 including a sub-message 885 with the query 'high blood pressure' to allow the user to determine if the changed query meets the user's intention.

According to an embodiment of the present disclosure, the electronic device (for example, the electronic device 101 or 410) may provide the user with a result of a search in association with the changed query. The user may set an application or a format to be used for displaying the result of the search. For example, the user may designate an application (for example, Excel) to display the search result provided in the form of a list, in the form of a table. The electronic device may process the search result using the result generating module 530, to be appropriate for the corresponding application (for example, Excel), and may display the same.

Figure 9:
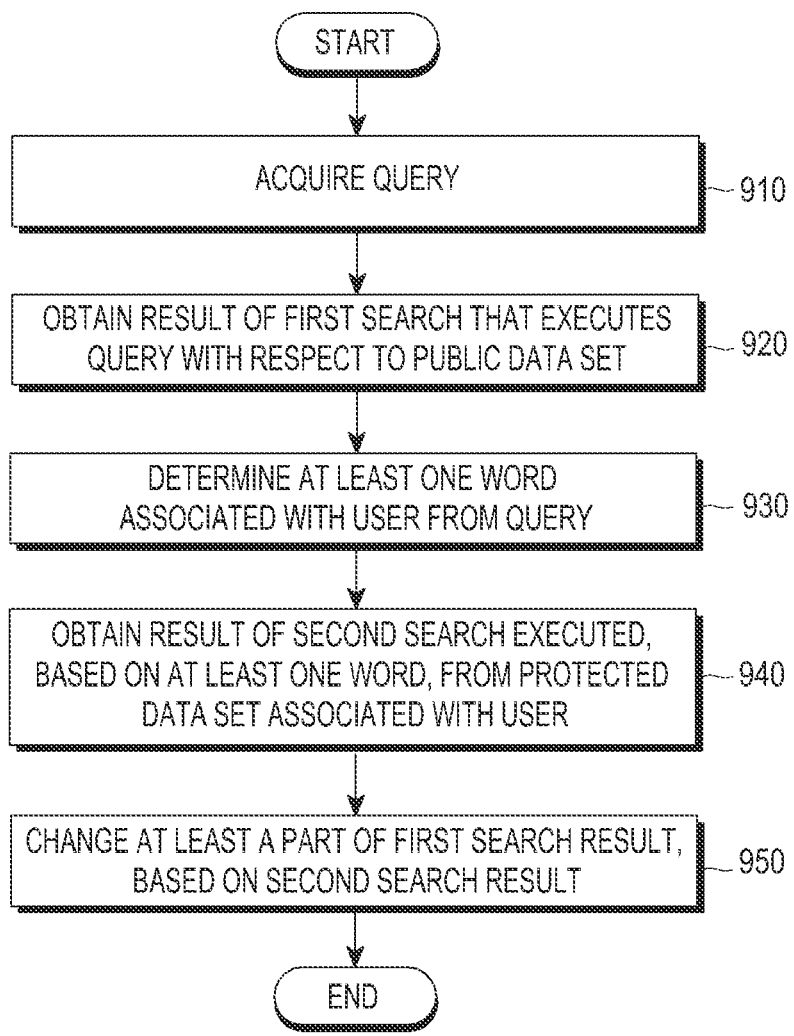
FIG. 9 is a flowchart illustrating a method of processing a query of an electronic device according to various embodiments of the present disclosure.

FIG. 9 is a flowchart illustrating a query processing method of an electronic device (for example, the electronic device 101 or 410) according to various embodiments of the present disclosure.

Referring to FIG. 9, in operation 910, the electronic device acquires a query. The query may be acquired through a request that a user inputs through the electronic device. Alternatively, when context information associated with the electronic device satisfies a designated condition, the query may be acquired.

In operation 920, the electronic device (for example, electronic device 101 or 410) obtains a result of a first search (a result of a search from a web search engine) executed from public data set, in association with the query.

In operation 930, the electronic device (for example, the electronic device 101 or 410) may determine at least one word associated with a user, from the query. For example, the electronic device may determine whether a word (for example, 'I,' 'me,' 'my,' or the like) that is deduced to be associated with the user, is included in the query, and may determine at least one word that is to be used when the query is executed with respect to a protected data set.

In operation 940, the electronic device (for example, the electronic device 101 or 410) determines the protected data set (for example, a health application DB) to which the query is to be executed based on the determined word. The electronic device may obtain a result of a second search by executing the query, based on the at least one word, with respect to the protected data set (for example, health application DB) associated with the user.

In operation 950, the electronic device (for example, the electronic device 101 or 410) may change at least a part of the result of the first search, based on the second search result. For example, the electronic device may change a part of a general search result (change the order of items of the result or execute filtering the result) based on information associated with the user and may display the same.

The operations included in the process or the method illustrated in FIG. 7 or 9 (for example, operations 710 to 750 and operations 910 to 950) may be executed sequentially, in parallel, repeatedly, or heuristically. For example, operation 920 and operation 930 may be executed in parallel or sequentially. Furthermore, the operations may be performed in a different order, some of the operations may be omitted, or other operations may be added.

According to various embodiments of the present disclosure, an electronic device (for example, the electronic device) acquires a query, determines at least one word associated with a user who corresponds to the electronic device, from the query, using one or more processors, obtains a result of a first search executed, based on the at least one word, from a set of protected data associated with the user, changes at least a part of the query based on the result of the first search, and provides a result of a second search executed, based on the changed query, from at least a part of a set of public data.

According to various embodiments of the present disclosure, the operation of acquiring of the query determines whether context information associated with the electronic device satisfies a designated condition.

According to various embodiments of the present disclosure, the operation of determining determines a word that indicates the user as the at least one word.

According to various embodiments of the present disclosure, the operation of determining changes at least a part of the query when a word that indicates the user does not exist in the query.

According to various embodiments of the present disclosure, the protected data set comprises one or more pieces of data associated with privacy of the user, which is configured to allow access based on authentication of the user.

According to various embodiments of the present disclosure, the of obtaining the result of the first search includes determining a category of the protected data set, from which the first search is to be executed based on a category of the at least one word.

According to various embodiments of the present disclosure, the first search is executed using at least one of an access scheme and an encryption algorithm, which corresponds to the determined category, from among a plurality of access schemes or a plurality of encryption algorithms corresponding to a plurality of different protection levels.

According to various embodiments of the present disclosure, the operation of obtaining the result of the first search includes transmitting a request for the first search, to an external device of the electronic device, and obtaining the result of the first search in response to the request.

According to various embodiments of the present disclosure, the operation of obtaining the result of the first search includes generating another query based on the at least one word, transmitting the other query to an external device, and obtaining the result of the first search in response to the other query.

According to various embodiments of the present disclosure, the operation of changing the query includes changing at least a few words or a value of the result of the first search into other words or another value.

According to various embodiments of the present disclosure, the operation of acquiring the query includes acquiring the query through an external device of the electronic device.

According to various embodiments of the present disclosure, the operation of obtaining the result of the first search includes executing an encryption algorithm with respect to the protected information set, based on the at least one word.

According to various embodiments of the present disclosure, the operation of obtaining the result of the first search includes transmitting the at least one word to an external device, and obtaining the result of the first search in response to the transmission.

According to various embodiments of the present disclosure, the result of the first search includes a plurality of items, and the operation of changing the query includes changing the query based on an item selected out of the plurality of items, based on an input of the user.

According to various embodiments of the present disclosure, the method of the electronic device (for example, the electronic device 410) may include acquiring a query, obtaining a result of a first search that executes the query with respect to a set of public data, determining at least one word associated with a user corresponding to the electronic device from the query, using one or more processors, obtaining a result of a second search executed, based on the at least one word, from a set of protected data associated with the user, and changing at least a part of the result of the first search, based on the result of the second search.

According to various embodiments of the present disclosure, the operation of determining includes determining whether the query includes a word indicating the user.

According to various embodiments of the present disclosure, the operation of obtaining the result of the second search includes determining a category of the protected data set, from which the second search is to be executed, based on a category of the at least one word.

According to various embodiments of the present disclosure, a storage device that stores instructions is provided. The instructions are configured to enable at least one processor to implement at least one operation when the instructions are executed by the at least one processor. The at least one operation includes acquiring a query, determining at least one word associated with a user who corresponds to the electronic device, from the query, using one or more processors, obtaining a result of a first search executed, based on the at least one word, from a part of a set of protected data associated with the user, changing at least a part of the query based on the result of the first search, and providing a result of a second search executed, based on the changed query, from at least a part of a set of public data.

According to various embodiments of the present disclosure, a storage device that stores instructions is provided. The instructions are configured to enable at least one processor to implement at least one operation when the instructions are executed by the at least one processor. The at least one operation includes acquiring a query, obtaining a result of a first search that executes the query with respect to a set of public data, determining at least one word associated with a user corresponding to the electronic device from the query, using one or more processors, obtaining a result of a second search executed, based on the at least one word, from a set of protected data associated with the user, and changing at least a part of the result of the first search, based on the result of the second search.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of an electronic device, the method comprising:
   obtaining, by at least one processor, a query from a user;
   identifying, by the at least one processor, at least one word associated with the user from the query;
   identifying, by the at least one processor, that the query relates to protected data of the user stored in a protected data memory;
   accessing, by the at least one processor, at least a part of the protected data in the protected data memory using an authentication code required for accessing the protected data;
   obtaining, by the at least one processor, a result of a first search executed on the at least the part of the protected data based on the at least one word, the result comprising another at least one word obtained based on the at least one word;
   changing, by the at least one processor, the query based on the result of the first search, the change comprising changing the at least one word with the other at least one word based on the result of the first search; and
   providing, by the at least one processor, a result of a second search executed on at least a part of a set of public data based on the changed query,
   wherein the result of the first search includes a plurality of items; and
   wherein the at least one processor is further configured to change the query based on an item selected out of the plurality of items, based on an input of the user.

2. The method of claim 1, wherein the obtaining of the query comprises:
   identifying whether context information associated with the electronic device satisfies a designated condition.

3. The method of claim 1, wherein the identifying of the at least one word comprises:
   identifying a word that indicates the user to be the at least one word.

4. The method of claim 1, wherein the identifying comprises:
   when a word that indicates the user does not exist in the query, changing at least a part of the query.

5. The method of claim 1, wherein the protected data comprises one or more pieces of data associated with privacy of the user, which is configured to allow access based on the authentication code.

6. The method of claim 1, wherein the obtaining of the result of the first search comprises:
   identifying a category of the protected data, from which the first search is to be executed based on a category of the at least one word.

7. The method of claim 6, wherein the first search is executed using at least one of an access scheme and an encryption algorithm, which corresponds to the identified category, from among a plurality of access schemes or a plurality of encryption algorithms corresponding to a plurality of different protection levels.

8. The method of claim 1, wherein the obtaining of the result of the first search comprises:
transmitting a request for the first search, to an external device of the electronic device; and
obtaining the result of the first search in response to the request.

9. The method of claim 1, wherein the obtaining of the result of the first search comprises:
obtaining another query based on the at least one word;
transmitting the other query to an external device; and
obtaining the result of the first search in response to the other query.

10. The method of claim 1, wherein the changing of the query comprises:
changing at least a few words or a value of the result of the first search into other words or another value.

11. An electronic device comprising:
at least one processor;
a protected data memory, communicatively coupled to the at least one processor, configured to store information associated with a user; and
wherein the at least one processor is configured to execute:
obtaining a query from the user,
identifying at least one word associated with the user, from the query,
identifying that the query relates to protected data of the user stored in a protected data memory,
accessing at least a part of the protected data in the protected data memory using an authentication code required for accessing the protected data,
obtaining a result of a first search executed on the at least the part of the protected data based on the at least one word, the result comprising another at least one word obtained based on the at least one word,
changing the query, based on the result of the first search, the change comprising changing the at least one word with the other at least one word based on the result of the first search, and
providing a result of a second search executed on at least a part of a set of public data based on the changed query,
wherein the result of the first search includes a plurality of items; and
wherein the at least one processor is further configured to change the query based on an item selected out of the plurality of items, based on an input of the user.

12. The electronic device of claim 11, wherein the at least one processor is further configured to obtain the query through an external device of the electronic device.

13. The electronic device of claim 11, wherein the at least one processor is further configured to execute an encryption algorithm with respect to the protected data, based on the at least one word.

14. The electronic device of claim 11, wherein the at least one processor is further configured to transmit the at least one word to an external device, and to obtain the result of the first search in response to the transmission.

15. A method of an electronic device, the method comprising:
obtaining, by at least one processor, a query from a user;
obtaining, by the at least one processor, a result of a first search that executes the query with respect to a set of public data;
identifying, by the at least one processor, at least one word associated with the user from the query, using the at least one processor;
identifying, by the at least one processor, that the query relates to protected data of the user stored in a protected data memory;
accessing, by the at least one processor, at least a part of the protected data in the protected data memory using an authentication code required for accessing the protected data;
obtaining, by the at least one processor, a result of a second search executed on the at least the part of the protected data based on the at least one word, the result of the second search comprising another at least one word obtained based on the at least one word; and
changing, by the at least one processor, the at least one word with the other at least one word, based on the result of the second search,
wherein the result of the first search includes a plurality of items; and
wherein the at least one processor is further configured to change the query based on an item selected out of the plurality of items, based on an input of the user.

16. The method of claim 15, wherein the identifying of the at least one word comprises:
identifying whether the query includes a word indicating the user.

17. The method of claim 15, wherein the obtaining of the result of the second search comprises:
identifying a category of the protected data, from which the second search is to be executed, based on a category of the at least one word.

18. An electronic device comprising:
at least one processor;
a protected data memory, communicatively coupled to the at least one processor, configured to store information associated with a user of the electronic device; and
wherein the at least one processor is configured to execute:
obtaining a query from the user,
obtaining a result of a first search that executes the query with respect to a set of public data,
identifying at least one word associated with the user, from the query,
identifying that the query relates to protected data of the user stored in a protected data memory,
accessing at least a part of the protected data in the protected data memory using an authentication code required for accessing the protected data,
obtaining a result of a second search executed on the at least the part of the protected data based on the at least one word, the result comprising another at least one word obtained based on the at least one word, and
changing the at least one word with the other at least one word associated with the user in the query, based on the result of the second search,
wherein the result of the first search includes a plurality of items; and
wherein the at least one processor is further configured to change the query based on an item selected out of the plurality of items, based on an input of the user.

19. The electronic device of claim 18, wherein the at least one processor is further configured to identify a category of the protected data, from which the second search is to be executed based on a category of the at least one word.

* * * * *